(12) United States Patent
Klein

(10) Patent No.: US 8,086,288 B2
(45) Date of Patent: Dec. 27, 2011

(54) MINIATURE WIRELESS EARRING HEADSET

(76) Inventor: Eric Klein, San Francisco, CA (US)

( * ) Notice: Subject to any disclaimer, the term of this patent is extended or adjusted under 35 U.S.C. 154(b) by 1218 days.

(21) Appl. No.: 11/818,846

(22) Filed: Jun. 15, 2007

(65) Prior Publication Data

US 2008/0311966 A1 Dec. 18, 2008

(51) Int. Cl.
*G06F 15/16* (2006.01)
(52) U.S. Cl. ..................................... 455/575.2; 381/322
(58) Field of Classification Search ............... 455/550.1, 455/575.2; 381/322, 334, 370, 376, 380
See application file for complete search history.

(56) References Cited

U.S. PATENT DOCUMENTS

| | | | |
|---|---|---|---|
| 6,047,076 A | 4/2000 | Yang | |
| 6,230,029 B1 | 5/2001 | Hahn et al. | |
| 2002/0039427 A1 | 4/2002 | Whitwell | |
| 2003/0022690 A1 | 1/2003 | Beyda | |
| 2004/0066948 A1* | 4/2004 | Bogeskov-Jensen | 381/376 |
| 2004/0136555 A1 | 7/2004 | Enzmann | |
| 2005/0003849 A1 | 1/2005 | Ramian | |
| 2005/0031145 A1 | 2/2005 | Maltan et al. | |
| 2005/0031147 A1 | 2/2005 | Viala | |
| 2007/0004473 A1 | 1/2007 | Clark et al. | |
| 2007/0133836 A1 | 6/2007 | Lee | |

\* cited by examiner

*Primary Examiner* — Sam Bhattacharya
(74) *Attorney, Agent, or Firm* — Thomas M. Freiburger

(57) ABSTRACT

A battery-powered miniature wireless headset is worn as a single earring or as a pair of earrings. The headset communicates with a phone or other host over a bidirectional wireless communication link allowing hands-free operation. The wireless earring headset is comprised of an electronics module (18), a speaker assembly (17), a microphone assembly (16), an antenna (68), a battery (62), user interface devices such as a switch (28) and LED (30), and an attachment means employing either a clamp or a pierced earring post (24) with clutch (26). The electronics module, which may be a single chip, comprises a wireless transceiver, a processor with associated memory, an audio codec, power supply electronics, and other components. In use the device is attached to the pinna of the wearer's ear (99) using either a clamp or a post inserted through a pinna piercing and secured by a clutch or nut. The clamp or post may be permanently attached to the device or removably attached using a magnetic or mechanical attachment means. The user positions the speaker inside of, or at the entrance to, the ear canal. The microphone is mounted in such a way that it points toward the user's mouth and may be positioned on a boom (22) to move it closer to the mouth.

48 Claims, 20 Drawing Sheets

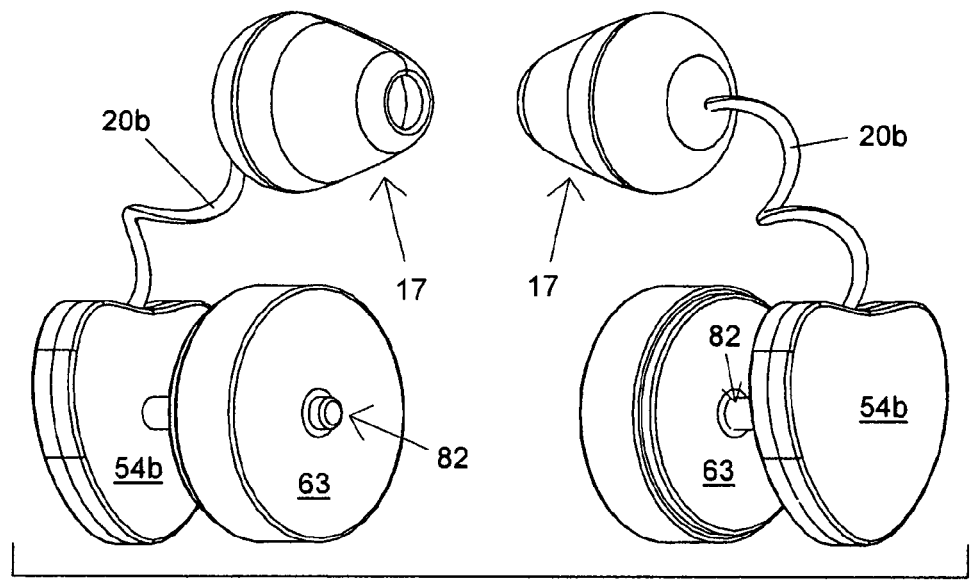
Fig. 15a
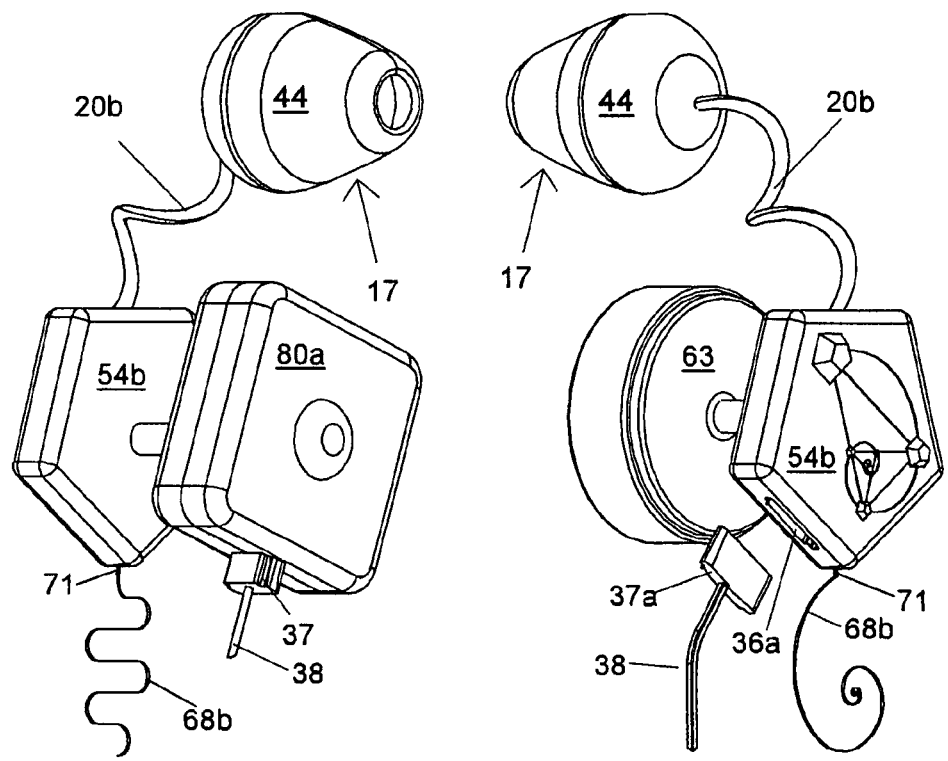
Fig 15b
Fig 15c

MINIATURE WIRELESS EARRING HEADSET

BACKGROUND OF THE INVENTION

The invention concerns digital wireless audio headsets that comprise a miniature device or pair of devices that are mounted over, adjacent to, or in the pinna. Miniature headsets that touch no part of the head, other than the pinna or ear canal, may be referred to as earsets. Earsets form a proper subset of headsets and share the same capabilities.

Headsets may play audio such as music, be used as a wireless phone headset, or provide a voice interface to another device such as a computer.

Wireless headsets are becoming increasingly popular accessories for mobile phone handsets. They provide a safe, hands-free way to make and receive calls when it is not convenient to hold a phone handset. Marketing experts project rapid growth in headset sales volume. Concern about automotive safety is driving demand for hands-free devices for use while driving. Additionally, headsets allow movement of the cell phone transmitter away from the user's head, reducing the electromagnetic field strength that reaches the brain and thereby reducing potentially harmful effects.

Conventional wired headsets are hampered by the need for a wire connection to the phone. They restrict freedom of movement and impose strict limitations on the location of the handset. Wireless headsets are much more compelling. Users can make and receive calls when their handset is in a pocket, briefcase, or even in the next room.

Currently available wireless headsets attach to the head by use of a headband similar to a one-sided headphone or loop behind the pinna like an eyeglass temple piece. These configurations may not be suitable for extended wear because they're uncomfortable or because they're unattractive. Putting them on when the phone rings creates an awkward rush. Most styles fit only a minority of people because proper fit depends upon the shape and size of the pinna and head, which vary greatly, and are thus uncomfortable to wear for long periods.

A worn headset attenuates the user's perception of background sound. Current headset designs may have either an open back or a closed back. An open back minimizes background sound attenuation while a closed back maximizes attenuation. Ideally, and extended-wear headset would selectively attenuate background sound allowing the user to hear music or voice from the headset or, when the user needs to interact with immediate environment, to hear surrounding sounds.

Earring jewelry is common and techniques have been developed to attach earrings securely and comfortably. Some of these techniques can be adapted for a headset, such as a post and clutch (or nut) for pierced ears or a spring or screw clip for non-pierced. However, an audio headset is heavier than the vast majority of earrings. A heavy earring cannot comfortably be held in place with a spring or screw clip. A heavy earring suspended from a piercing is uncomfortable, can cause injury, and will, over time, stretch a piercing from a round hole into a long slot.

The human pinna is sensitive. A miniature wireless headset or earset that is not attached securely, is poorly supported, or is unbalanced in weight will bounce, pull, and rub, causing user discomfort. An earset that is too heavy will be similarly unbearable. Earset power requirements need to be met with systems that are low in weight yet deliver sufficient use time.

Several published patent applications and patents show methods of attaching a headset to the pinna and head.

U.S. Pat. No. 6,230,029 to Hahn et al. (2001) entitled "Modular Wireless Headset System" discloses a wireless headset which has a detachably mounted battery pack and an antenna built into the antenna boom. The headset attaches to the pinna using a hook.

U.S. Pat. No. 6,047,076 to Yang (2000) entitled "Earphone-Microphone System Having Double Pinna Braces" discloses an earphone-microphone set that has a pair of adjustable pinna braces that are placed behind the pinna at the top and bottom. The device is wired (not wireless) and does not attach in the manner of an earring.

Published Patent Application US 2004/0066948 to Bogeskov-Jensen entitled "Earring for a Headset" discloses a device that is attached to the pinna using a loop that surrounds the outside of the pinna. The claimed innovation involves the shape and construction of the attachment loop. The device does not have the form of an earring used as jewelry.

Published Patent Application US 2002/0039427 to Whitwell et al. entitled "Audio Apparatus" discloses a transducer that excites vibration in the pinna that is carried to the inner pinna by conduction. This application does not describe the structure or construction of a wireless link. It does not describe any technique for attachment to a pierced earlobe.

Published Patent Application US 2004/0136555 to Enzmann entitled "Aided Pinna Bud" describes a hearing aid which has the claimed capability of acting as a wireless phone headset. This device is meant for a person whose hearing is deficient, rather than a person with normal hearing. The device is described as an "pinna bud" but the physical shape of the device is not further disclosed. The application does not teach how a practical device could be built in this form factor. Components needed for a wireless headset such as a transceiver, antenna, battery capable of powering the transceiver, etc. are not shown. A pinna bud generally has no microphone boom, thus the microphone is essentially within the pinna and is in a poor position for receiving the user's own speech.

Published Patent Application US 2003/0022690 to Beyda et al. entitled "Concealed Wireless Telephone" discloses a phone headset hidden in an earring, a pair of glasses, or another commonly worn accessory. However, the patent application does not teach how to build a wireless headset in the illustrated form factor.

Accordingly, several advantages of one or more aspects of the invention are:

(a) to provide an improved wireless headset;

(b) to provide a wireless headset which may be worn comfortably for long periods;

(c) to provide a wireless headset which may be shaped and decorated as jewelry;

(d) to provide a wireless headset which may be easily adjusted to fit a variety of pinna shapes;

(e) to provide a wireless headset which may be used for audio listening, as a phone headset, or to interface to a computer;

(f) to provide a wireless headset which need not be removed to interact with the outside world;

(g) to provide a wireless headset which acts either as an open design, allowing outside sound to be heard, or as a closed design, excluding outside sound, under electronic control of the user.

(h) to provide a wireless earset that is balanced in weight;

(i) to provide a miniature wireless headset with power system designs that are small in size and weight yet have sufficient capacity for practical duration of use;

(j) to provide a wireless earset with user swappable power systems;

(k) to provide a miniature wireless earset with antenna configurations that provide adequate signal propagation yet are compatible with the severe size and weight constraints imposed by the form factor;

(l) to provide a wireless jewelry earset with decorative or unobtrusive antenna;

(m) to provide a dual mode earset that may be used in either wireless or wired configurations;

SUMMARY OF THE INVENTION

A miniature wireless earring headset or earset according to one aspect comprises a battery-powered miniature wireless audio headset that attaches to the pinna using mechanisms commonly used to attach earring jewelry. The earset wirelessly communicates with the host phone, allowing hands-free operation. The earset may consist of a single device worn on a single pinna or a pair of devices worn on both ears. Each device consists of an electronics module, a speaker assembly, a microphone assembly, an antenna, a battery, user interface devices such as switches and LEDs, and a mechanism of attachment to the pinna utilizing a clamp or piercing post.

In one aspect the device is attached to the wearer's pinna(s) by inserting a post through a portion of the pinna (such as an earlobe), piercing and securing it with a clutch or nut. The post may be permanently attached to the device or removably attached using a magnetic or mechanical attachment means. The post may conduct power from a battery located behind the pinna integrated into the clutch.

In another aspect the device is attached to the wearer's pinna(s) by means of a spring clamp or screw clamp that squeezes the earlobe.

The user may position the speaker assembly inside of, or at the entrance to, the ear canal. The speaker assembly is held in the canal by friction and is connected to the body of the device using a short rigid or semi-rigid boom. The speaker assembly stabilizes and helps to support the weight of the earset. The distance and angle between the speaker and the post is adjustable to compensate for different pinna sizes, shapes, and piercing locations. The device can be offered in a single size with an adjustable speaker boom, in a variety of sizes with adjustable speaker boom, or a variety of sizes with non-adjustable speaker boom.

The microphone can be mounted in such a way that it points towards the user's mouth and preferentially is positioned on a boom or utilizes a voice tube to enhance voice reception. The microphone input is used for three different purposes, depending upon the current state of the device. In the first case, where the device is being used as a phone earset, the user's words are received by the microphone, processed, and transmitted to the host phone via the wireless link. In the second case, where the user is interacting with the immediate environment, the microphone input is routed to the earset speaker. In the third case, where the user wishes to mute environmental sound, the microphone input is used to generate anti-noise for active noise control. Note that audio streams may be mixed so that the user is listening to a voice or audio stream mixed with the anti-noise or environmental sound stream.

The same hardware and electronics may be used for an audio player, phone earset, or combined unit. The only differences are in the earset firmware and the wireless data packets.

The earset may be powered by a compact power source, most commonly a primary or secondary (rechargeable) battery. The battery has enough capacity to power the earset for at least two hours of telephone conversation and at least eight hours of standby operation. The device may be powered on either before or after attaching it to the pinna.

The preferred embodiment uses the BLUETOOTH (trademark of Bluetooth SIG, Inc.) wireless protocol to communicate between earset and host. Bluetooth is a specification for short-distance bidirectional wireless communication between two devices.

The earring earset may be formed in any number of plain or decorative designs. Miniature components allow the device to be small enough to be worn comfortably for long periods.

The above and other objects, advantages and features of the invention will be apparent from the following description of a preferred embodiment, considered along with the accompanying drawings.

DESCRIPTION OF THE DRAWINGS

FIGS. 1-14 illustrate a right-ear version of an earset according to one embodiment. In these figures:

FIG. 4 is a perspective view of the left side of the earset demonstrating a round case and detachable post.

FIG. 5 is a perspective view of the earset that incorporates an adjustable detachable post.

FIG. 8 is a perspective view of the FIG. 7a embodiment that utilizes a microphone boom as an antenna.

FIG. 11 is a diagram detailing the parts of the human pinna.

FIG. 13 is a perspective view of a two-piece embodiment that utilizes a flexible speaker cord.

FIG. 14 is a perspective view of a two-piece embodiment that utilizes a flexible speaker cord and support boom.

FIG. 15*a* is a perspective view of a pair of listen only earsets with no microphone.

FIG. 15*b* is a perspective view of the back of a listen only earset with dangling antenna and battery port connector.

FIG. 15*c* is a perspective view of the front of a listen only decorated earset with dangling antenna and serial bus port connector.

DESCRIPTION OF PREFERRED EMBODIMENTS

Figure 1A:
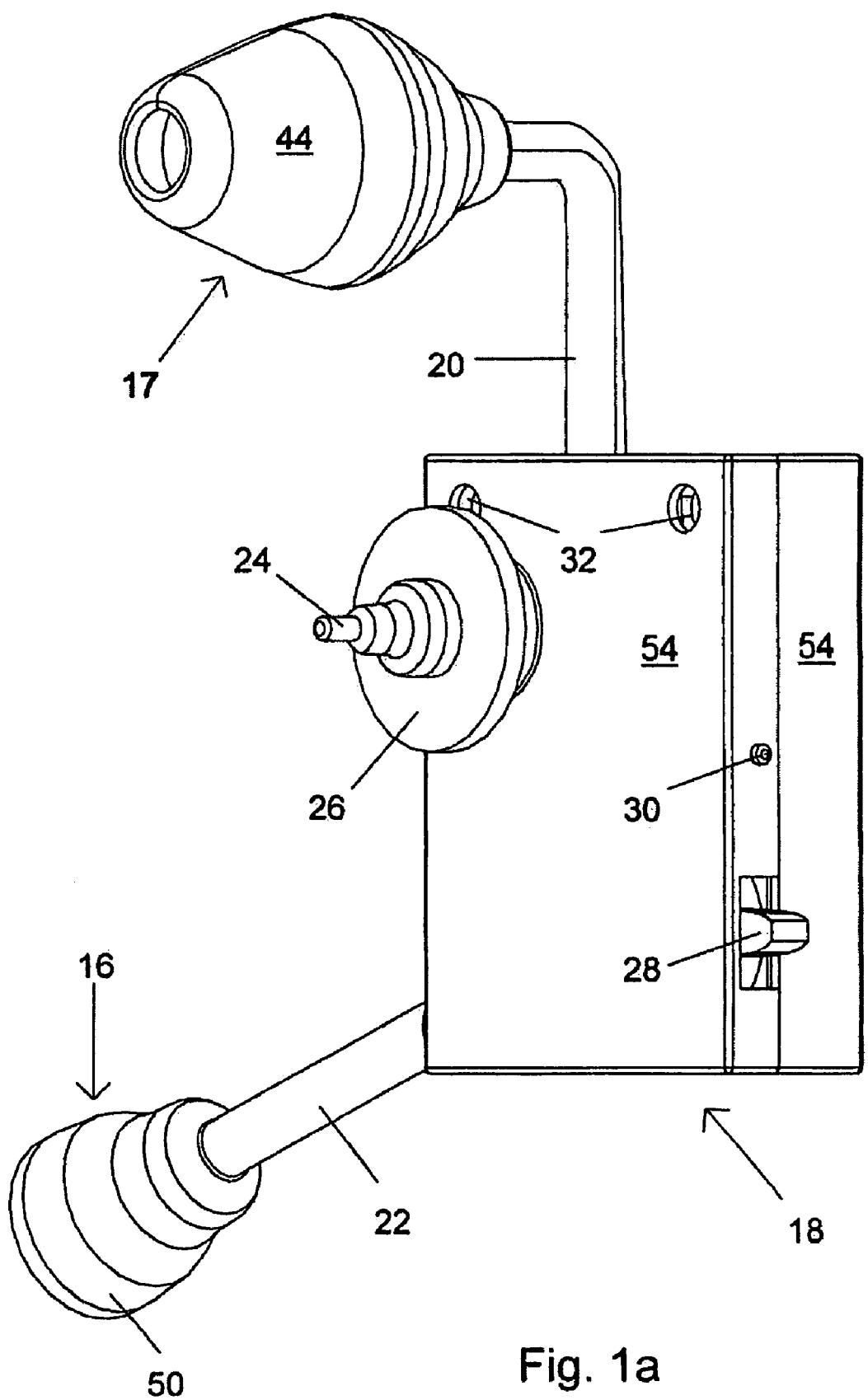
FIG. 1a is a perspective view of a left side of one embodiment of the earset.

FIG. 1*a* shows a left perspective view of one embodiment of an integrated wireless earring earset. The earset is designed to be worn on the pinna of the right ear and the left side faces the head of the wearer. A speaker assembly 17 attaches to the upper left of a electronics assembly 18 using a configurable speaker boom 20. A plastic speaker cover 44 encases a speaker and hardware (not visible in this figure). A microphone assembly 16 attaches to the electronics assembly 18 using a configurable microphone boom 22. A pierced earring clutch 26 is shown assembled over a pierced earring post 24. A pair of battery-charging ports 32 provide access for charging the battery. ("Battery" as used in this patent means a single energy cell or a stack or plurality of such cells.) A light-emitting diode (LED) 30 is mounted on the electronics assembly 18 just above a combination power, volume, call-pickup and hangup switch 28. The earring post and clutch may be formed from stainless steel, titanium, or other corrosion-resistant metal. This embodiment is integrated in the sense that the electronics and battery reside in a single enclosure.

Figure 1B:
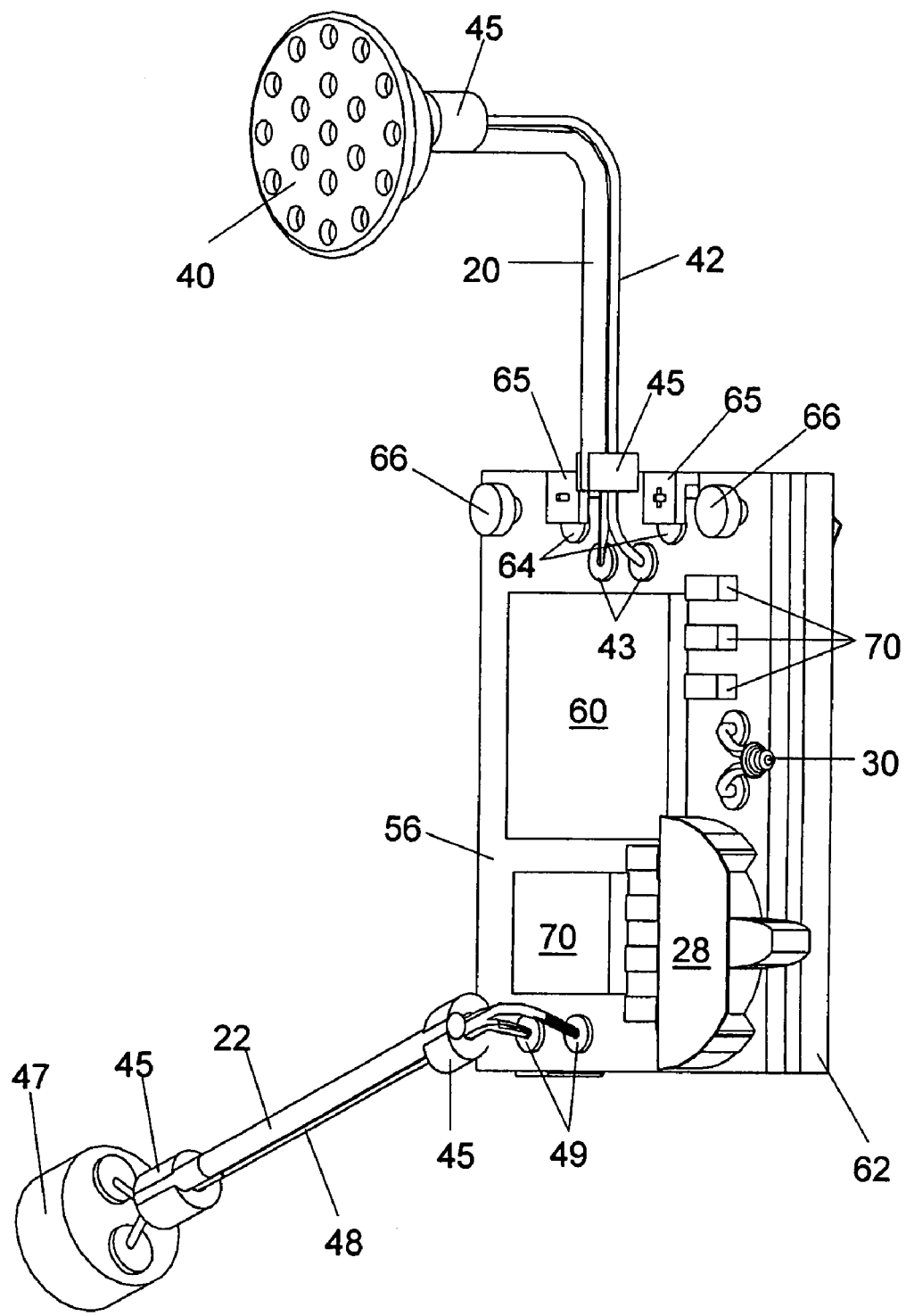
FIG. 1b is a perspective view of the left side of the FIG. 1a embodiment with all coverings removed to show the electronic components.

FIG. 1*b*—Inside View

FIG. 1*b* shows a left perspective view of the FIG. 1*a* embodiment with all coverings removed. A speaker 40 is connected to a printed circuit board (PCB) 56 using three wires. Two speaker wires 42 make the electrical connection to two PCB speaker contacts 43. A boom wire 46 provides structural support for the speaker boom. The boom 20 comprises a Boom wire that may be bent using moderate force but is still stiff enough to maintain the modified shape. Two C-shaped wire clamps 45 clamp the boom wire between their jaws. The speaker wires are threaded through the open center of the clamps.

A microphone 47 is connected to the PCB 56 using three wires. Two microphone wires 48 make electrical connection to two PCB microphone contacts 49. The boom 22 comprises a wire that supports the microphone boom and acts as a ground connected to the outside of the microphone case. As with the speaker wires, two wire clamps 45 clamp the boom wire between their jaws and the signal wires are threaded through the open center of the clamps. Some microphones require three terminals, in which case the boom wire may be used as a ground or an additional wire may be the ground.

Two battery terminals 64 connect to two PCB battery contacts 65. Two battery-charging pins 66 extend upward from the PCB and are accessible through the cover. A battery 62 is mounted under the PCB; only an edge of the battery is visible in this view.

The LED 30 is shown electrically connected to the PCB. A combination switch 28 is mounted on the PCB with its electrical connections (not shown) under the body of the switch.

An RF communication chip 60 is mounted on the PCB. Preferably the RF chip conforms to the Bluetooth wireless protocol, although other two way wireless protocols can be used. A base of the chip is covered with a multiplicity of contacts organized as a pin grid array (PGA)—not shown. Corresponding contacts on the PCB board connect electrically with the chip.

Miscellaneous components 70 are shown for illustration purposes only to demonstrate the large area that is available around the Bluetooth chip. The drawing is not meant to illustrate the PCB layout or to enumerate all the components necessary to implement a Bluetooth headset. Many Bluetooth headset designs have been implemented and the technology is well known to those knowledgeable in the art.

Figure 1C:
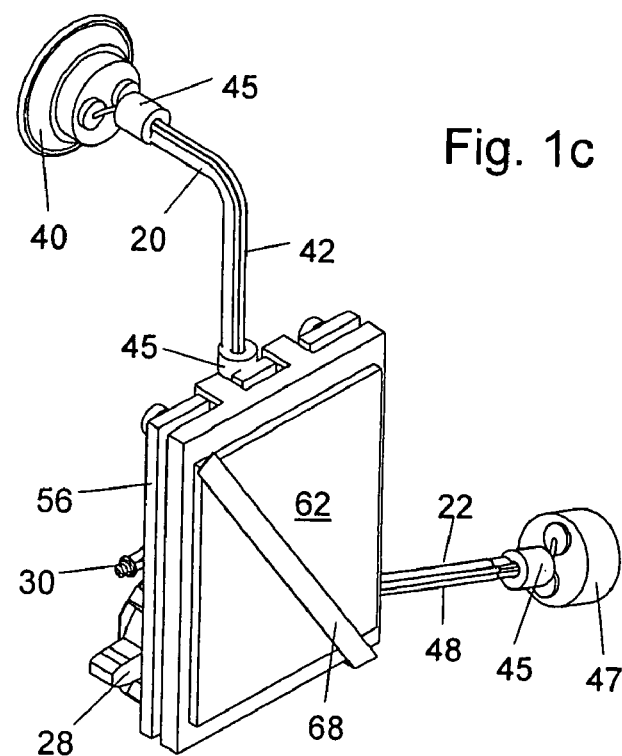
FIG. 1c is a perspective view of the right side of the FIG. 1a embodiment with all coverings removed.

FIG. 1*c*—Right Side View

FIG. 1*c* shows a right perspective view of the FIG. 1*a* embodiment with coverings removed. The right side faces away from the head of the wearer. The battery 62 covers the entire right side of the PCB. The battery is generally the largest and heaviest single component of the earset. A quarter-wavelength strip antenna 68 extends diagonally across the battery and is electrically insulated from the battery case. In this view it is assumed that the battery has an insulating cover. If the battery has no such cover, a piece of electrical tape may be inserted between the battery case and the antenna.

Figure 1D:
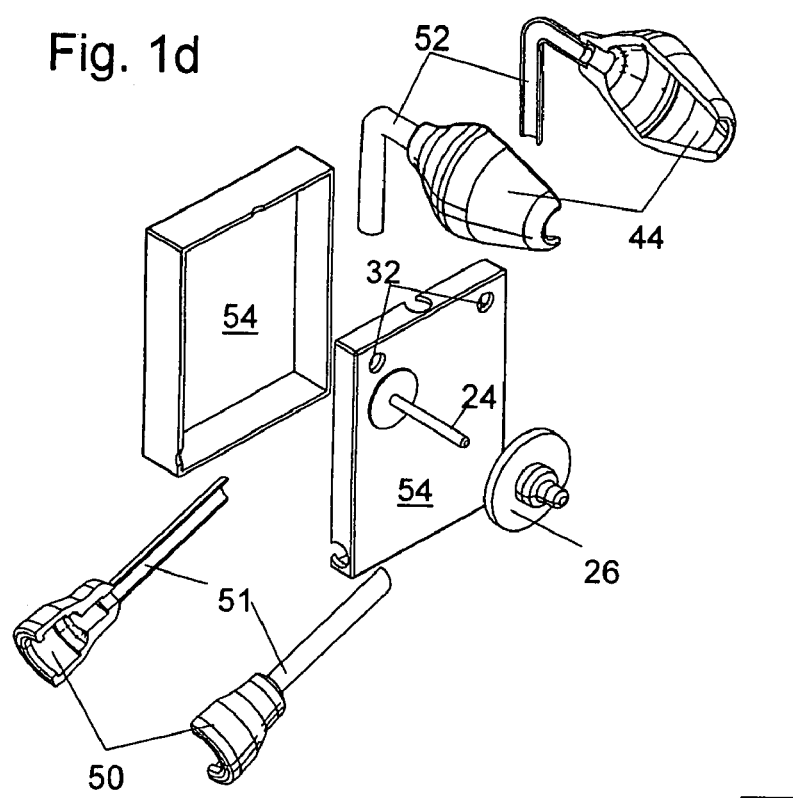
FIG. 1d is an exploded perspective view of the left side of the FIG. 1a embodiment showing details of the coverings.

FIG. 1*d*—Exploded View

FIG. 1*d* shows an exploded perspective view of the FIG. 1*a* embodiment illustrating details of the earset covering. The plastic speaker cover 44 houses the speaker, wires, and wire clamp. The speaker cover is shaped to fit comfortably into the ear canal. A plastic speaker wire cover 52 covers the wires and connects to the speaker cover and a electronics cover 54. The cover 54 houses the PCB board and battery and other electronic components. The case may be formed of plastic or other material that doesn't block the antenna. The electronics cover is pierced by the battery-charging ports 32. In this embodiment, the earring post 24 is permanently attached to the electronics cover. The earring clutch 26 is shown disassembled from the post. A microphone cover 50 houses the microphone, wires, and wire clamp. A microphone wire cover 51 covers the wires and connects to the microphone cover and electronics cover.

Operation of the First Embodiment

In use the earring earset is attached to the wearer's ear pinna by inserting the post 24 through a pinna piercing, usually at the lobe, and securing it with the clutch or nut 26 (FIG. 1*a*). The earset may be powered on either before or after attaching it to the ear. The user positions the speaker assembly inside of, or at the entrance to, the ear canal. The speaker position may be adjusted by bending the speaker boom. The speaker position in the ear canal stabilizes the earset and supports much of the weight. The microphone assembly is mounted in such a way that it points towards the user's mouth and may be positioned on the boom to move it closer to the mouth. It need not be directly at the mouth, and may be closer to the ear than to the mouth.

Combination switch 28 controls power, volume, call pickup, and hangup. The switch may be moved in three directions: up and down like a toggle switch and back like a pushbutton. Toggling the switch up increases speaker volume while toggling down reduces volume. Pressing backward signals the device to accept or hang up a call, depending upon whether a call is currently in progress. Pressing the switch backward and holding for a period of several seconds powers the device on or off.

The LED 30 lights when the earset is powered on. When a call is received, the LED flashes. When the user presses the switch to power the device down, the LED first changes color for several seconds, then goes dark when the earset powers down.

The earset communicates with a conventional or wireless telephone using a bidirectional wireless communication link. When powered on the earset is in standby mode, monitoring the wireless link, waiting for a call. When a call is received by the user's phone, the phone sends a ring signal to the earset, which generates an audible ring at the speaker. The user presses a switch, either on the phone or earset, to accept the call. The user's words are picked up by the earset microphone, converted from analog to digital, optionally processed to enhance voice clarity and reduce noise, processed in accordance with the link protocol, then transmitted to the phone via the wireless link. The other party's words are received by the phone and transmitted to the earset using the same wireless link. The earset receives the data, processes it in accordance with the link protocol, extracts the audio, performs a conversion from digital to analog, and sends the analog signal to the speaker. The user may terminate the call using a switch on the earset or phone, or the call may be terminated by the other party.

The currently preferred embodiment uses the Bluetooth wireless protocol to communicate between headset and phone. Bluetooth is a specification for short-distance wireless communication between two devices. Bluetooth devices operate at a radio frequency of approximately 2.4 GHz and have a typical maximum range of 10 meters at 2.5 mW maximum output power, though higher and lower power class devices have longer and shorter ranges respectively. The Bluetooth communication channel can support both data (asynchronous) and voice (synchronous) communications with a total bandwidth of 1 Mb/sec. Asynchronous mode is typically used for listening to music and other recorded audio. The audio can be buffered in the headset for greater fidelity, with the tradeoff that the audio is delayed. Voice data in a telephone conversation is synchronous (i.e., not buffered) since buffering the data causes perceptible delays that interfere with smooth conversation. The Bluetooth Special Interest Group (SIG) has published a headset specification (Section K6 in the Bluetooth profiles specification, v1.1) which defines a standard protocol for communicating between a phone and headset. RF circuit design is beyond the scope of this document but is well known to those knowledgeable in the art.

There are many Bluetooth headsets currently on the market and the technology is available off-the-shelf. For example, CSR of Cambridge, United Kingdom, offers a line of Bluetooth chips and related specifications, sold under the trademark BlueCore, that can be used to implement a Bluetooth headset. BlueCore 3-Multimedia combines radio frequency, baseband (digital processing), audio codec, power supply, and antenna balancing onto a single chip. BlueCore technology specifies a radio frequency schematic and printed board schematic that define the radio transceiver, reduced instruction set computer (RISC) processor module, necessary RAM, PROM or EPROM, and software. The next generation CSR chip, sold under the trademark BlueCore 4, is available in sample quantities. It requires less power and has higher bandwidth than previous models.

The Bluecore software implements an RF controller, Bluetooth software stack, headset library, and headset application. It handles user interface devices including buttons and LEDs, power management, microphone muting, speaker volume adjustment, and other functions. Other software functions include Digital Signal Processing (DSP) that sharpens the call at both ends. DSP functions include "active noise cancellation", automatic speaker volume control depending on ambient sound levels, automatic analysis of incoming signal to raise the volume of softer sections over the noise floor, and subtraction of ambient noise from the output audio.

User interface devices consist of switches and LEDs. The Bluetooth headset profile specifies four switches: power, volume up, volume down, and talk. The power and volume switches are self explanatory. The talk switch is activated when the user desires to answer a call. The LEDs indicate device states such as power status, call status, etc.

The power supply system is operated from a lithium-ion or lithium-polymer battery that provides a nominal voltage of 3.6V. The battery may be of a known type used in compact electronic devices. For example, a suitable lithium-ion Battery model GSP 051219 is produced by Great Power Battery Co., Ltd. of Guangdong Province, China. This battery provides a nominal 3.7 volt output, has a capacity of 70 mAh, weighs 1.8 grams, and is 19 mm long, 12 mm wide, and 5 mm thick. A slightly larger battery from the same manufacturer, model GSP 351624, provides a nominal 3.7 volt output, has a capacity of 100 mAh, weighs 2.3 grams, and is 24 mm long, 16 mm wide, and 3.5 mm thick. A voltage regulator, integrated into the BlueCore chip, supplies 3.0V to supply the flash memory (if used) and the codec. A separate on-chip regulator supplies 1.8 V. Most of the device is powered by the 1.8 V, including the radio and microprocessor.

An inexpensive printed antenna may be used. At 2.4 GHz a quarter wavelength antenna has a length of approximately 32 mm. Good results can be achieved with a simple flying-wire antenna or planar-inverted 'F' antenna (PIFA). Fractal antennas can operate efficiently at one-quarter the size of more traditional designs. More sophisticated antenna configurations may reduce radiated power levels while maintaining radio range. The antenna may be of a known type designed for compact devices. For example, the Impexa model antenna, available from the gigaAnt Co. of Lund, Sweden, is designed for 2.4 GHz operation, is PCB mountable, and is compact, measuring 6.1 mm long, 3.9 mm wide, and 1 mm thick.

The audio module is comprised of an on-chip audio codec, a microphone, and a speaker. The codec digitizes analog data from the microphone and performs band limiting and smoothing as required for voice coding. The codec accepts audio data and reconstructs it using a digital-to-analog converter for output to the speaker.

Miniature microphones and speakers are available that combine low power consumption with small size and weight. For example, Kingstate Electronics Corp. in Taiwan offers a miniature omnidirectional microphone, Model KEC-1042PBL. This disk-shaped microphone is 6.0 mm in diameter, 1.0 mm in height, and weighs 0.3 g. Kingstate offers several models of miniature speakers, including Model KAS- 10008. This disk-shaped speaker is 10.0 mm in diameter, 3.2 mm in height, and weighs 0.8 g. It has a power rating of 200 mW.

Figure 2A:
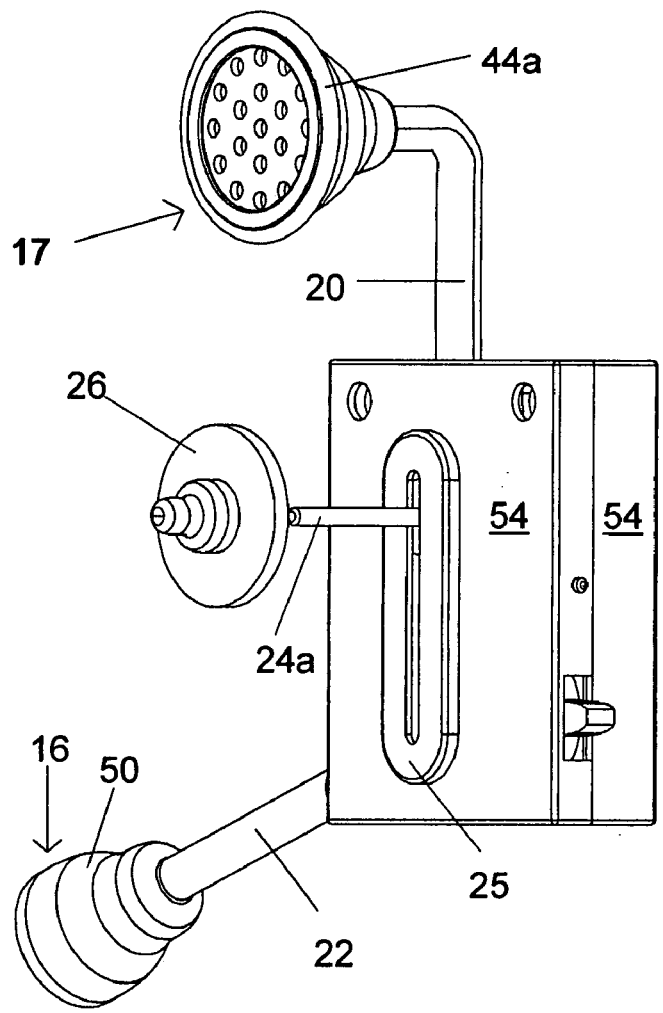
FIG. 2a is a perspective view of the left side of the earset demonstrating an adjustable post.
Figure 2B:
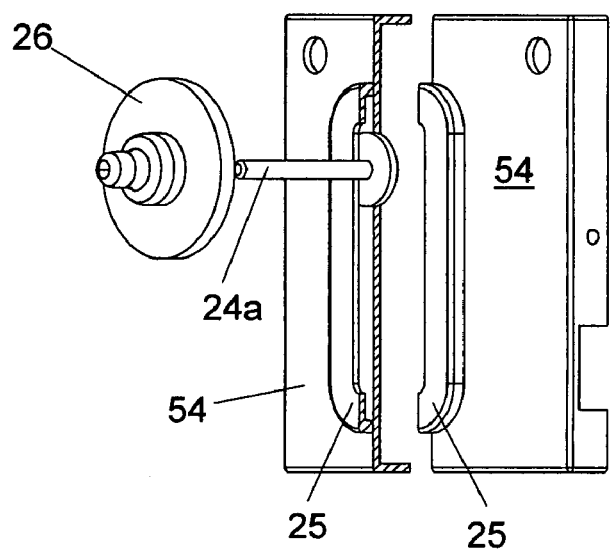
FIG. 2b is a sectional perspective view of a left processor housing of the FIG. 2a embodiment showing details of the adjustable post.

Alternative Embodiment with Adjustable Post—FIGS. 2a, 2b

The embodiment of FIG. 1a-1d uses a configurable speaker boom to adjust the earset for different pinna sizes and shapes, variations in piercing location, etc. Alternative embodiments may use other techniques, either instead of or in combination with, the configurable boom.

FIG. 2a is a perspective view of the left side of an embodiment of the earset employing an adjustable post 24a. The position of the post is adjusted by sliding it up and down in an adjustable post slot 25. The adjustable post may be used in conjunction with the speaker boom to enable the device to fit a greater variety or pinna sizes and shapes. An earbud speaker cover 44a may be used as an alternate to the canal speaker cover in any of the embodiments.

FIG. 2b is a sectional perspective view of the left processor housing showing details of the adjustable post. An interference or force fit between the base of the adjustable post and the interior of the post slot controls the amount of force necessary to move the post up and down. The moving force should be calibrated to be low enough to allow the post to be adjusted without undue difficulty but high enough to prevent unintended movement.

Alternative Attachment Means—FIGS. 3a-3e

Figure 3A:
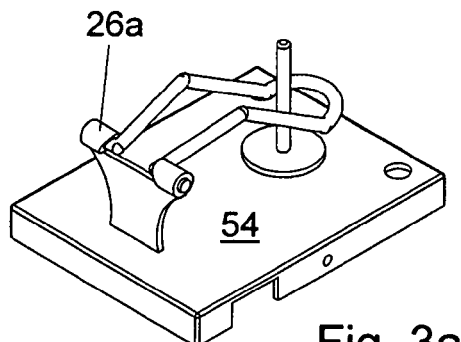
FIG. 3a-3e are perspective views of a left processor housing showing alternative attachment means.

FIG. 3a is a perspective view of the left processor housing of an embodiment of the earset that employs a hinged bail 26a as a post retainer. Hinged bail 26a is flipped up to expose the post for insertion into the piercing and is flipped down to secure the post.

Figure 3B:
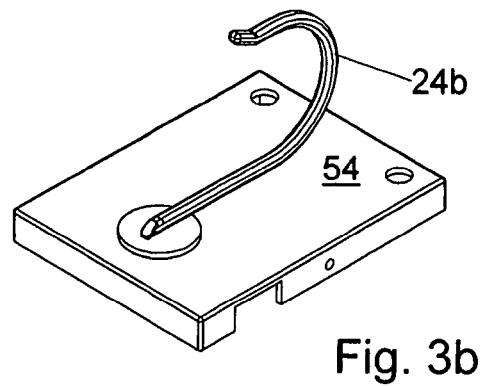

FIG. 3b is a perspective view of the left processor housing of an embodiment of the earset that employs a hook post 24b. The hook post is simpler and quicker to install on the pinna but is not as secure as the post and clutch or nut.

Figure 3C:
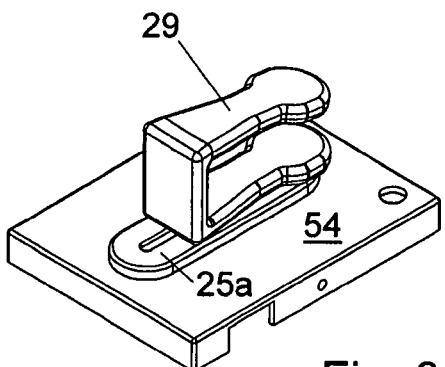
Figure 3D:
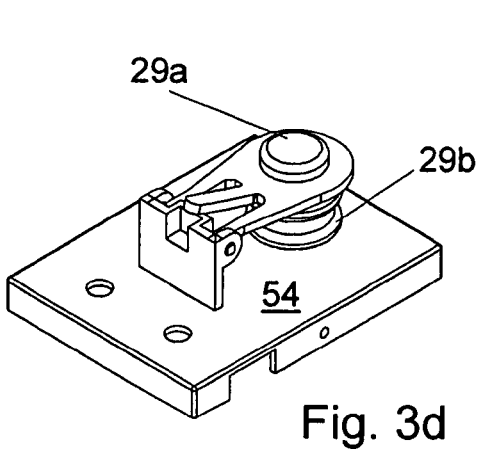
Figure 3E:
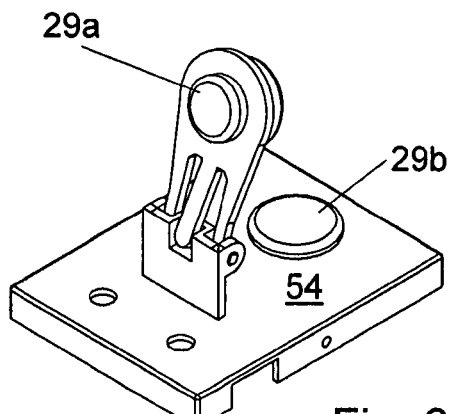

FIGS. 3c-3e show earset attachment means for non-pierced ears. FIG. 3c is a perspective view of the left processor housing of an embodiment of the earset that employs an adjustable pinna (lobe) clamp 29. In use, the user's earlobe is compressed between the two arms of the clamp. The position of the clamp may be adjusted vertically by sliding the clamp in an adjustable clamp slot 25a. The clamp may rotate in relation to the housing to provide greater adjustment capability.

FIG. 3d is a perspective view of the left processor housing of an embodiment of the earset that employs a hinged pinna clamp 29a, here shown in the closed position. In use, the user's earlobe is compressed between the pinna clamp 29a and a clamp base pad 29b creating friction to retain the earset. FIG. 3e shows pinna clamp 29a in the open position.

Figure 4:
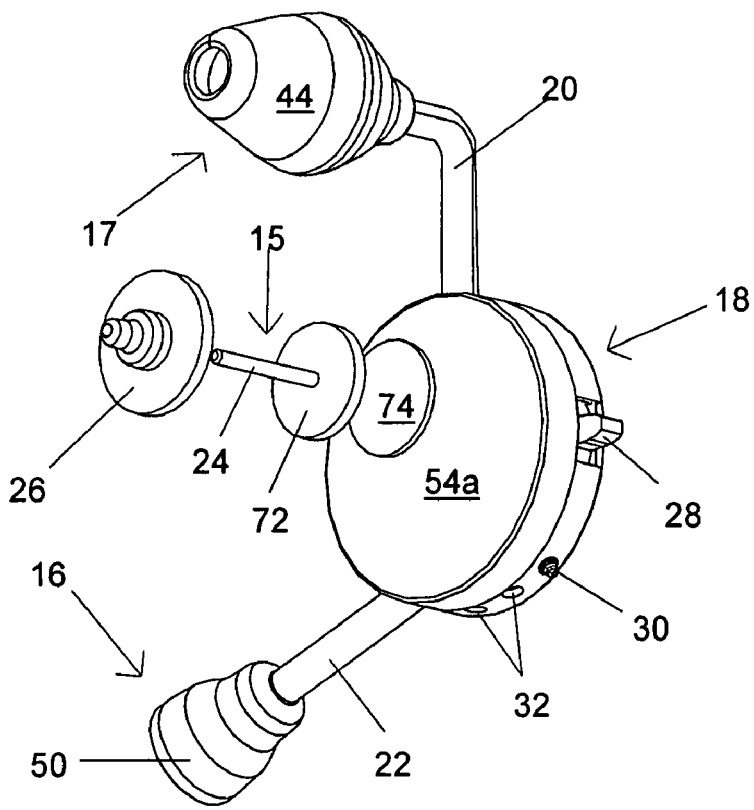
Figure 5:
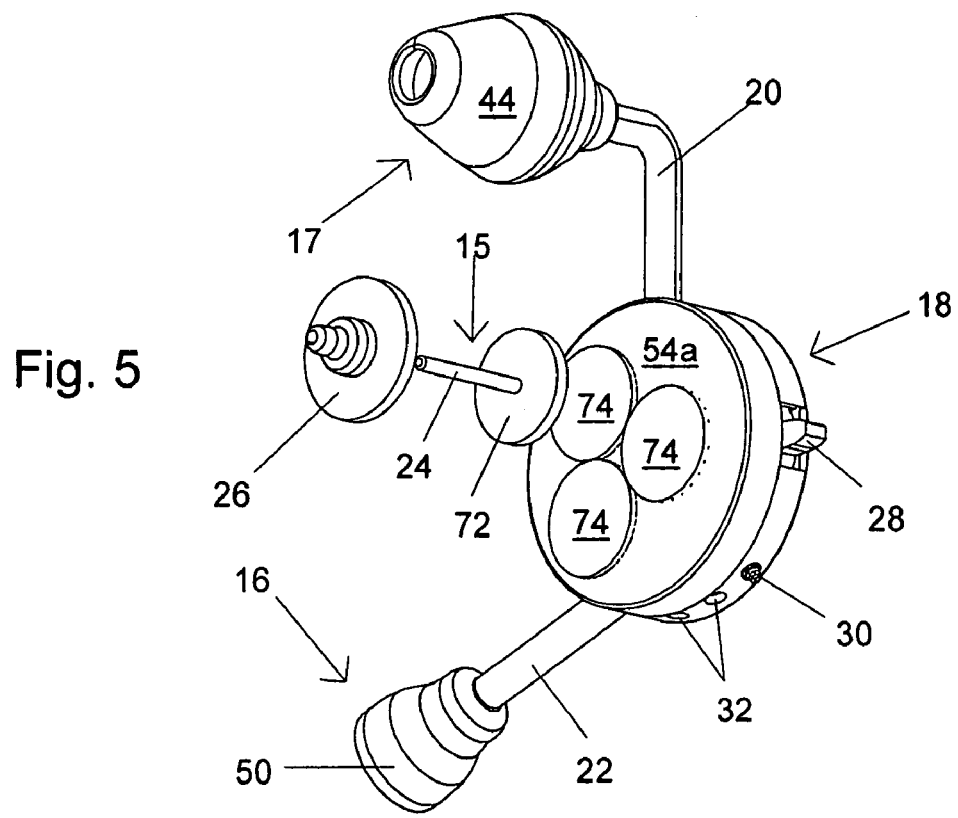

Alternative Embodiment with Detachable Post—FIGS. 4 and 5

FIG. 4 shows a left perspective view of another embodiment of the earset with a cylindrical electronics cover 54a that incorporates a detachable post 15. The case may be formed in a variety of shapes besides rectangular and cylindrical. The case shape is limited only by the size and shapes of the components, particularly the battery. This embodiment uses a coin-shaped battery (not shown). This version may use a PCB mounted antenna. Alternatively, the microphone boom wires can be used as the antenna, a strip antenna can be strung along the boom, or an antenna can be printed on the PCB.

Detachable post 15 is comprised of an earring post 24 that is permanently connected to a post magnet 72. An earset magnet 74 is permanently connected to electronics cover 54a. The magnets adhere to assemble the device, but the user may disassemble the device by drawing the two magnets apart. The device may be inserted into the piercing either before or after assembling the post and earset. The post magnet may be decoratively colored, shaped, and figured to present an attractive appearance when the earset is not attached. The preferred means of removably attaching the post to the earset uses magnets, but any number of mechanical attachment means can alternatively be constructed to perform the same function.

FIG. 5 is a perspective view of the earset that incorporates an adjustable detachable post. Post assembly 15 may be attached to the earset at any of three positions where earset magnets 74 are mounted.

Figure 6A:
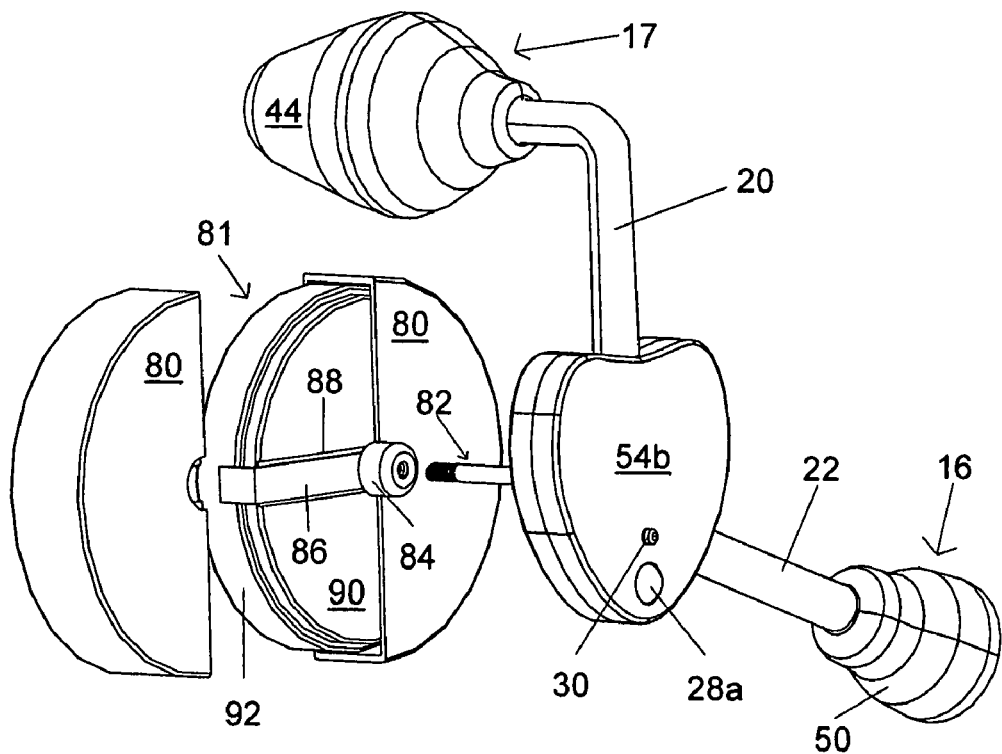
FIG. 6a is a perspective view of a two-piece embodiment of the earset wherein the battery is in a separate housing from the other electronics.
Figure 6B:
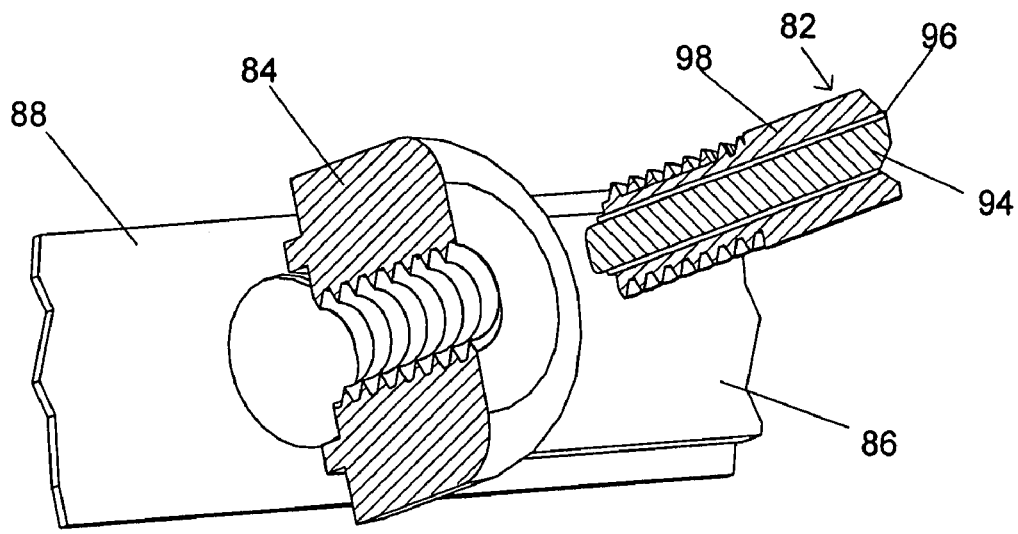
FIG. 6b is a sectional perspective view of the FIG. 10 embodiment illustrating details of power conduction.

Two-Piece Embodiment—FIGS. 6a and 6b

FIG. 6a is a perspective view of a two-piece embodiment of the earset wherein the battery is in a separate housing from the other electronics. A heart-shaped electronics cover 54b mounts LED 30 above a power-and-talk button 28a. This embodiment does not incorporate a mechanical volume control on the earset. A power-conducting post 82 is permanently attached to the electronics housing. A battery housing 80, shown here disassembled into left and right portions, encloses a battery 81 and an electrically conducting nut 84. The nut 84 makes electrical contact with a battery conductor 86, which in turn makes electrical contact with a positive battery terminal 92. The conductor 86 is prevented from making electrical contact with a negative battery terminal 90 by an insulating tape 88.

FIG. 6b is a sectional perspective view of a portion of the earset of FIG. 6a illustrating details of power conduction. Conductive post 82 is sliced longitudinally to show a post core conductor 94 which contacts the negative battery terminal, a post core insulator 96, and a post outer conductor 98, which is threaded to screw into the conductive nut 84. A hole in the insulating tape 88 allows the post core conductor to contact the negative battery terminal.

The battery shown in FIGS. 6a and 6b may be a primary (non-rechargeable) battery and is smaller than in other figures. Primary batteries typically have much higher energy density than secondary (rechargeable) batteries so a smaller battery can be used.

Alternative Two-Piece Embodiment—FIGS. 7a-7h

Figure 7A:
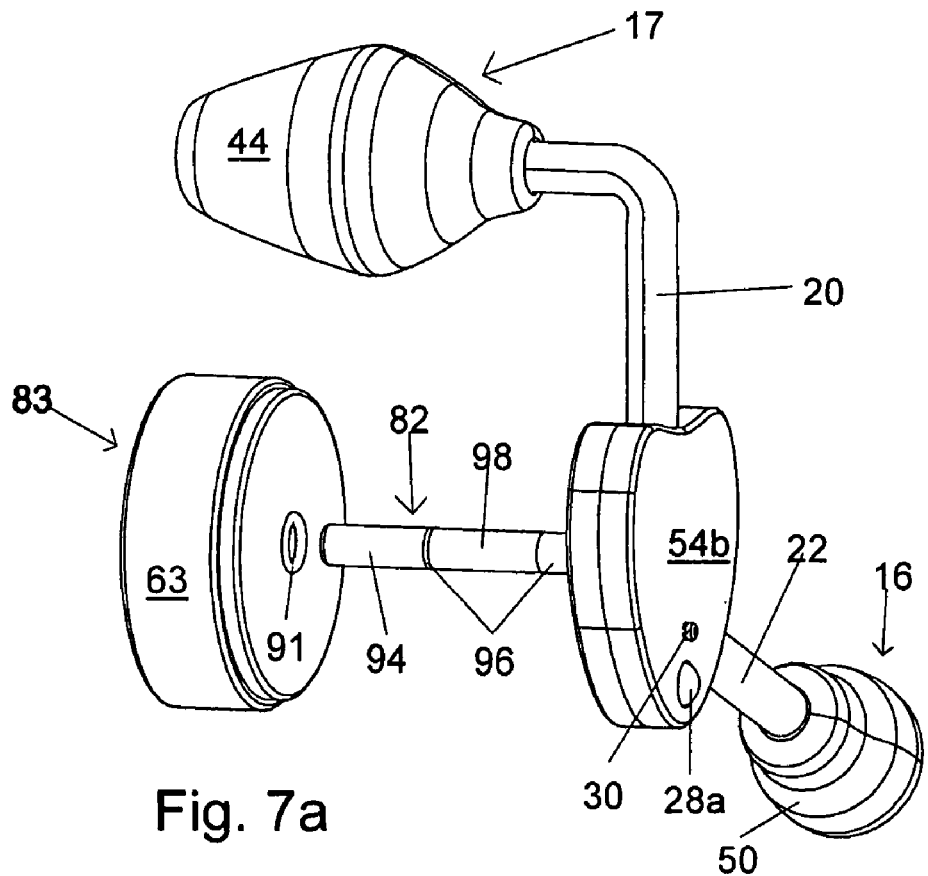
FIG. 7a is a perspective view of a two-piece embodiment that utilizes a pierced battery.

FIG. 7a is a perspective view of another two-piece embodiment that utilizes an optionally heart-shaped electronics cover 54b and a pierced battery assembly 83. The battery assembly consists of a pierced battery 63, a torus-shaped negative terminal 91, and a torus-shaped positive terminal 93 (not visible in this view). A power conducting post 82 is permanently attached to the electronics housing. When assembled, the post extends through the pinna and through a hole in the battery. A post core conductor 94 makes contact with a positive ring terminal 93 and a post outer conductor 98 contacts the negative ring terminal 91. This embodiment allows easy adjustment of the earring to fit earlobes of varying thicknesses. The surface of the battery 63, including the interior of the hole, may be coated with a non-conductive material to insulate against electrical shorting. The pierced battery may be constructed using lithium-polymer battery technology. Lithium-polymer batteries have high energy density, do not require rigid cases, and may be molded into almost any shape.

Figure 7B:
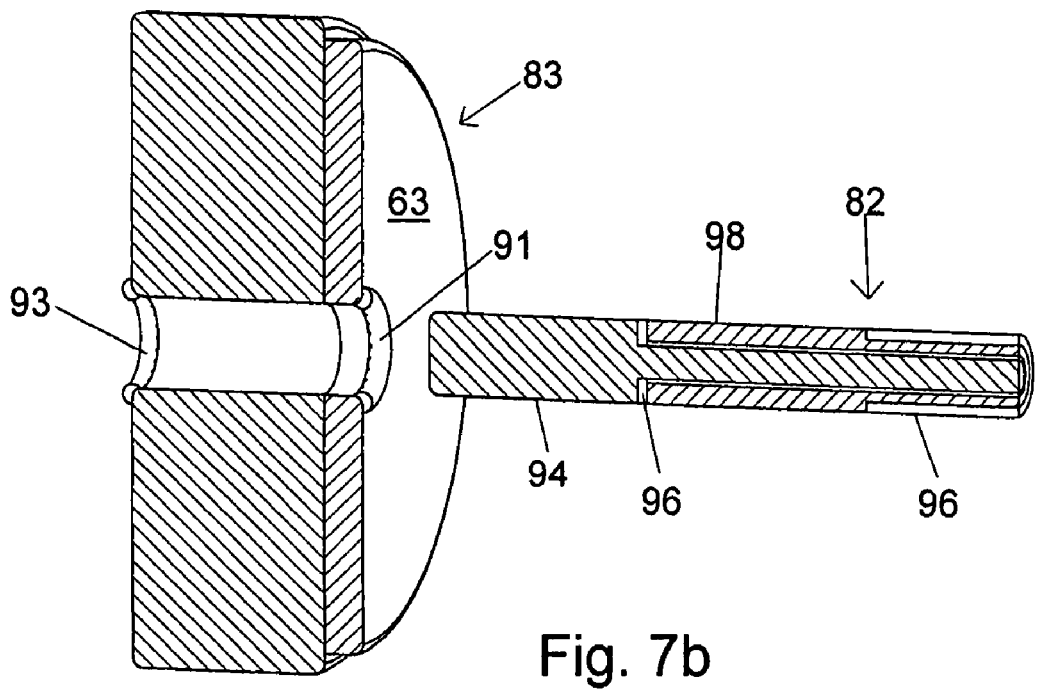
FIG. 7b is a sectional perspective view of the FIG. 7a embodiment showing details of the pierced battery and conducting post.

FIG. 7b is a detailed sectional perspective view of the battery assembly 83 and post 82 of FIG. 7a illustrating details of the post-and-clutch construction. Note that the conductors 91 and 93 are ring or torus shaped. Besides conducting electricity, the conductors are shaped and sized to create friction by interfering slightly with the movement of the post through the hole. Thus the pierced battery, with the addition of the torus shaped conductors, acts as the earring clutch. The conductors 94 and 98 are made shorter than the distance between the battery terminals 91 and 93 to prevent electrical shorting.

Figure 7C:
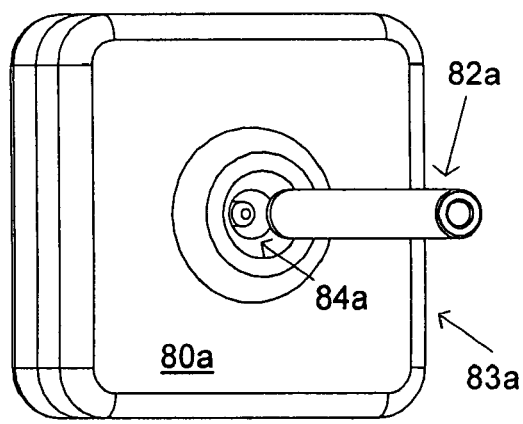
FIG. 7c is a perspective view of an alternate embodiment of a pierced battery housing that utilizes two batteries and an alternate conducting post embodiment.

FIG. 7c is a perspective view of an alternate embodiment of a rectangular pierced battery housing 80a that utilizes two batteries (batteries not visible in this view), an alternate power conducting post 82a, and a power conducting sleeve 84a.

Figure 7D:
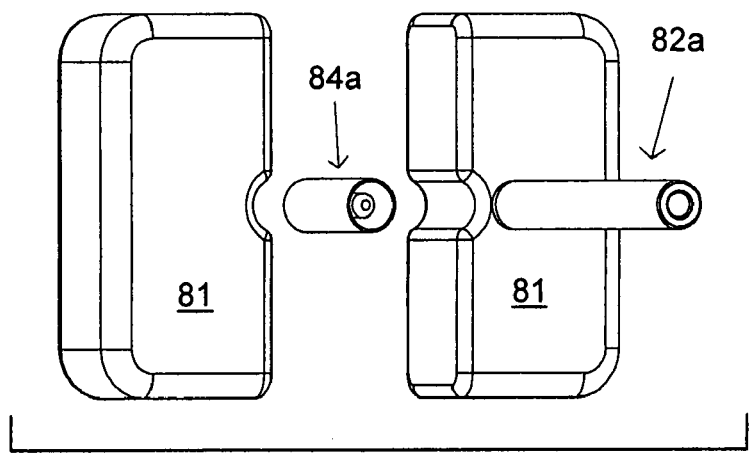
FIG. 7d is a perspective view of the FIG. 7c embodiment disassembled and with the housing removed.

FIG. 7d is a perspective view of the FIG. 7c embodiment disassembled and with the housing removed. Two batteries 81 are slotted to make room for a conducting sleeve 84a. Wiring connections between the batteries and power conductor are not shown.

Figure 7E:
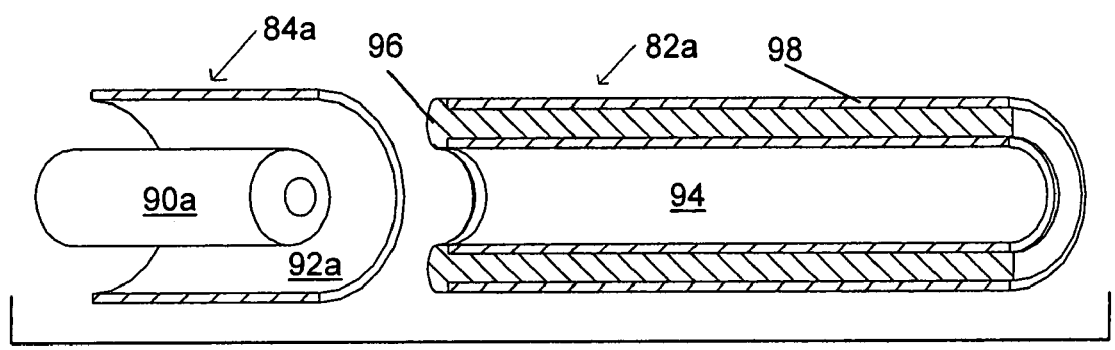
FIG. 7e is a sectional perspective view of the FIG. 7c embodiment showing details of an alternate conducting post embodiment.

FIG. 7e is a sectional perspective view of the FIG. 7c embodiment showing the details of the conducting post and sleeve. The hollow conducting post 82a utilizes a power plug style conducting post. A post outer conductor 98 and post core conductor 94 carry positive and negative voltage, and a post core insulator 96 insulates the conductors. The conducting sleeve 84a comprises an outer conductor 92a and an inner conductor 90a. When the post is assembled with the sleeve, post conductors 94 and 98 make electrical contact with sleeve conductors 90a and 92a respectively.

Figure 7F:
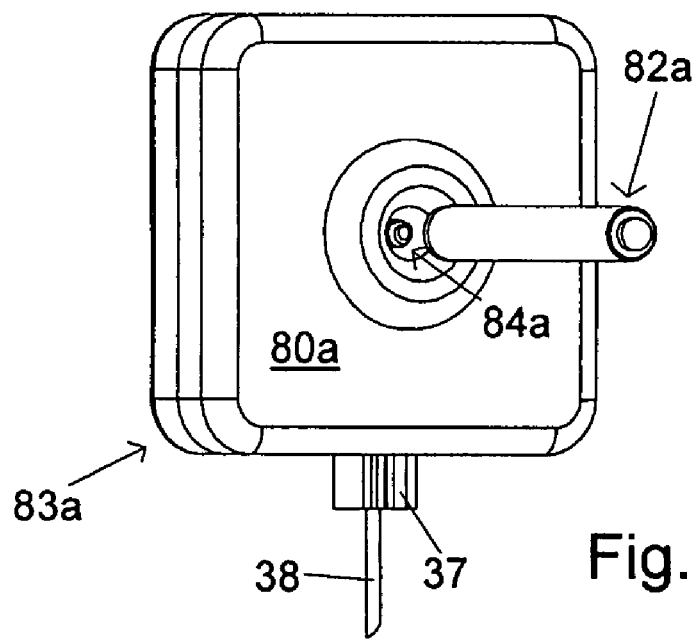
FIG. 7f is a perspective view of an alternate embodiment of a pierced battery housing, similar to FIG. 7c but utilizing a bus port connection and threaded post.

FIG. 7f is a perspective view of an alternate embodiment of a pierced battery housing, similar to FIG. 7c but utilizing an external power supply comprising a power plug 37 with an associated wire 38 that connects to a power socket 36 (not visible in this view). The plug supplies power to charge the batteries and power the earset. The cable 38 connects, at its other end, to a power supply device (host device not shown).

Figure 7G:
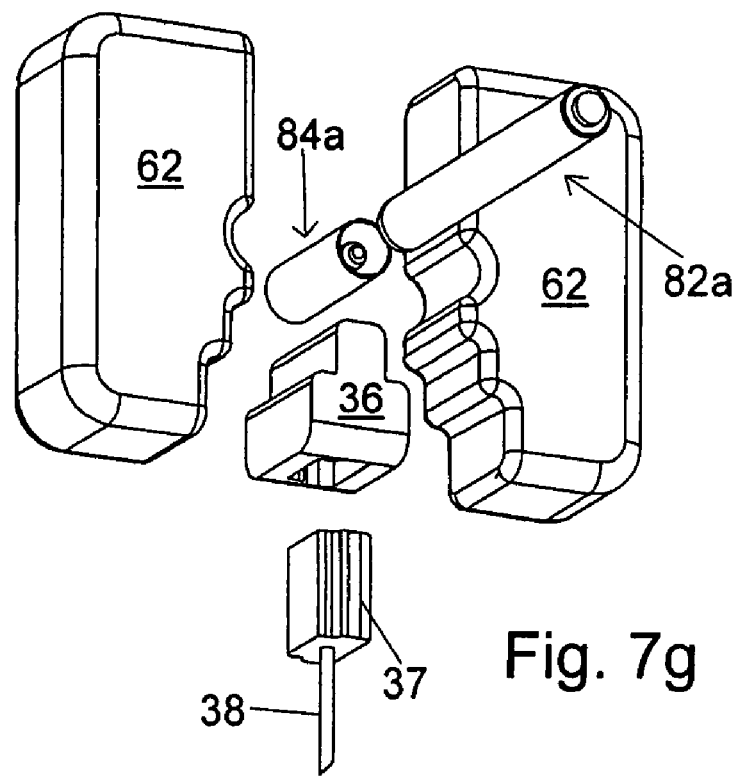
FIG. 7g is a perspective view of the FIG. 7f embodiment disassembled and with the housing removed.

FIG. 7g is a perspective view of the FIG. 7f embodiment disassembled and with the housing removed. The power socket 36 is shown, disassembled from power plug 37.

Figure 7H:
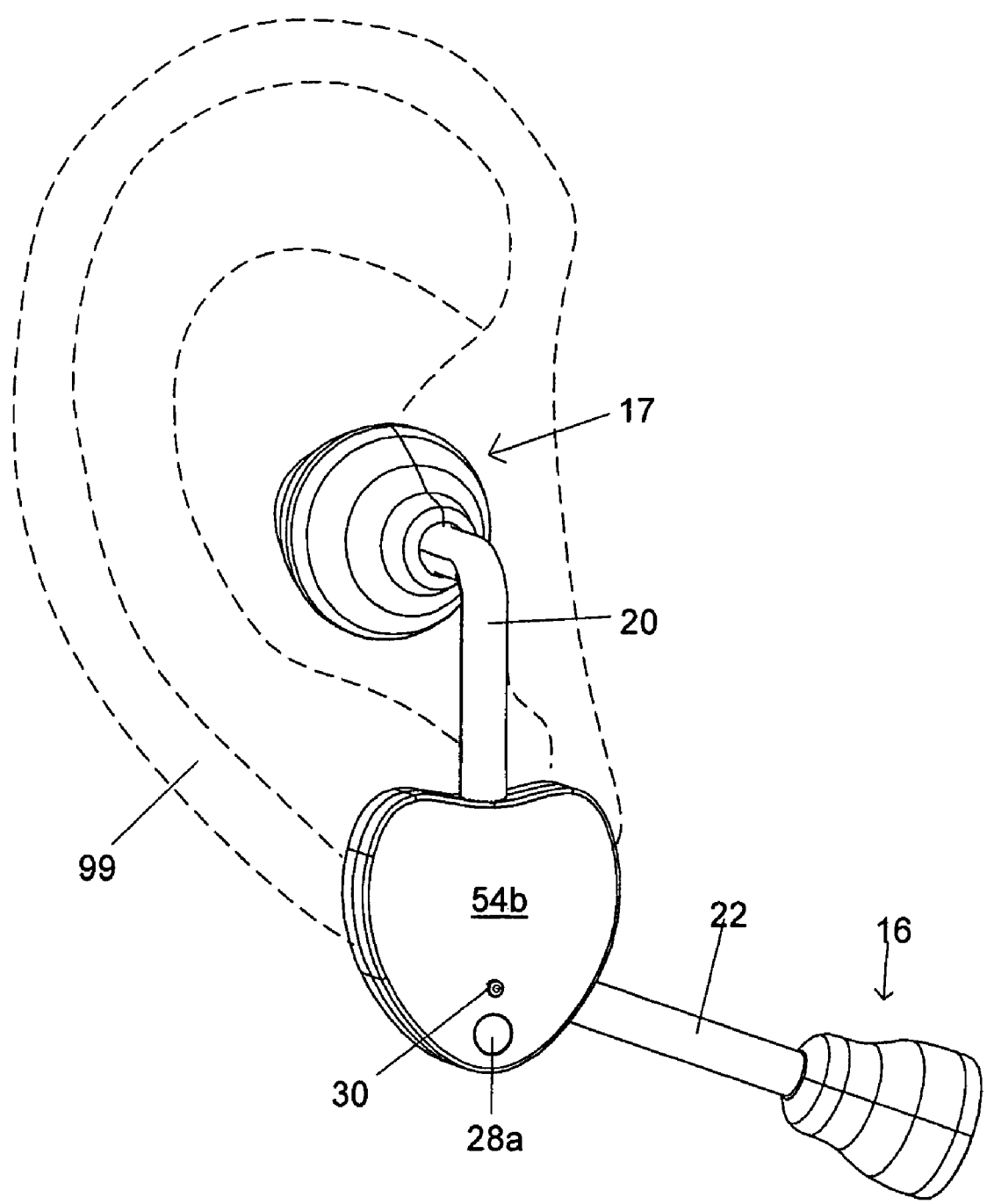
FIG. 7h is a perspective view of the FIG. 7a embodiment overlaid on the outline of a human pinna.

FIG. 7h is a perspective view of the FIG. 7a embodiment attached to a pinna 99 of a human ear. The post-and-battery assembly are hidden by the electronics cover and pinna.

The two two-piece embodiments (battery separate from electronics housing) illustrated in FIGS. 6a-6b and FIGS. 7a-7c have advantages over other embodiments. The position of the battery behind the pinna effectively hides the battery from view, creating a smaller perceived size for the device. The position of the electronics assembly at one end of the post and the battery at the other balances the device, thus reducing or eliminating torsion forces acting on the post. Reduction of torsion forces reduces the need for additional device support and reduces the potential for user discomfort caused by twisting of the post. The two-piece embodiments are more stable and therefore may exhibit greater utility than the one-piece embodiments. The two-piece embodiments incorporate a battery that is easy to replace and thus may use a primary battery or a small secondary battery that can be easily exchanged for a fresh replacement when needed.

Alternative Embodiment: Microphone Boom Antenna—FIG. 8

Figure 8:
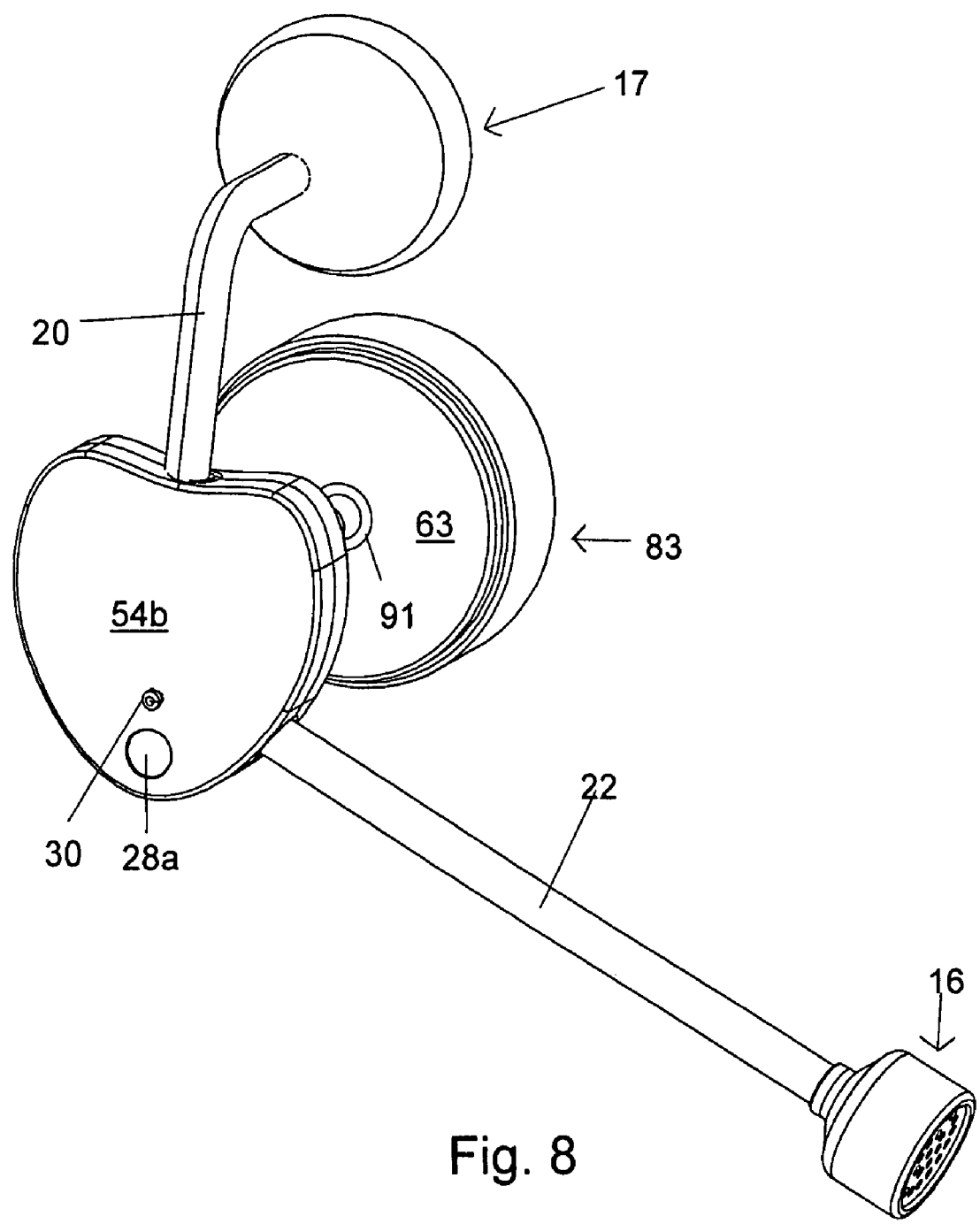
Figure 9A:
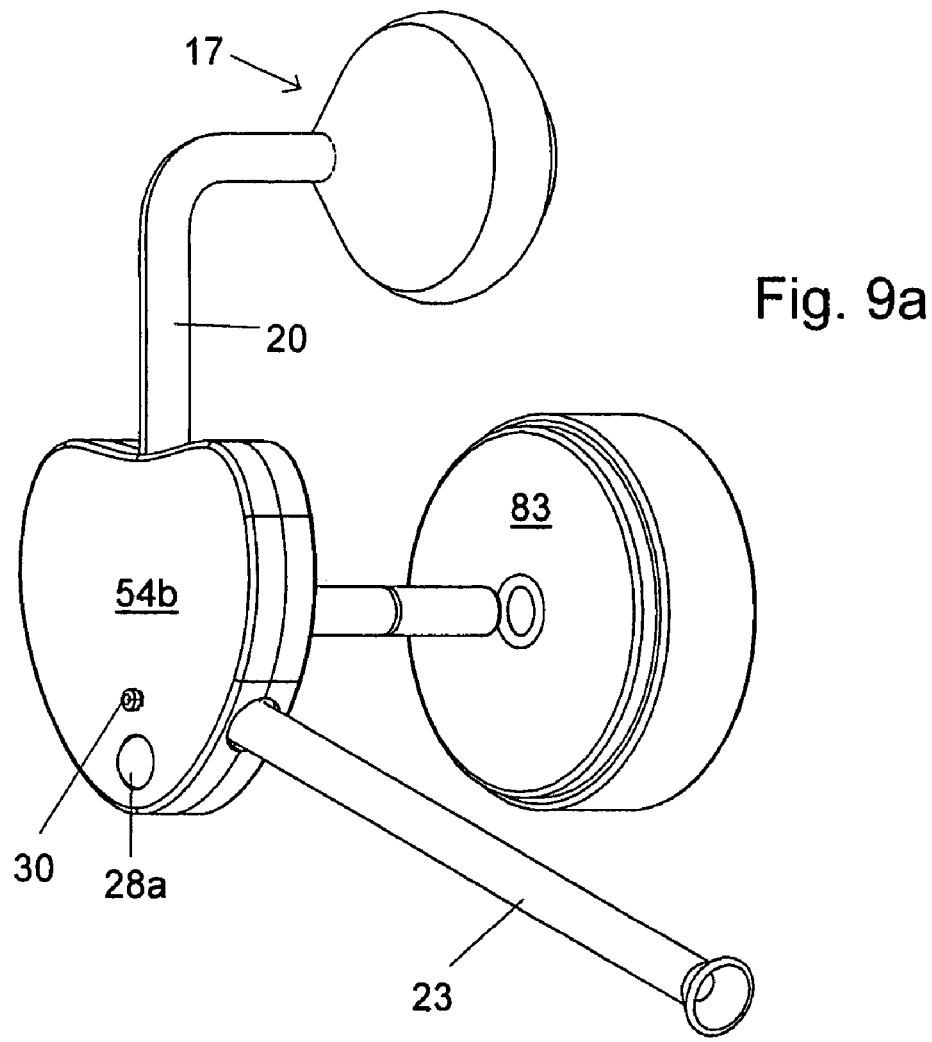
FIG. 9*a* is a perspective view of the FIG. 7*a* embodiment that utilizes a voice tube.
Figure 9B:
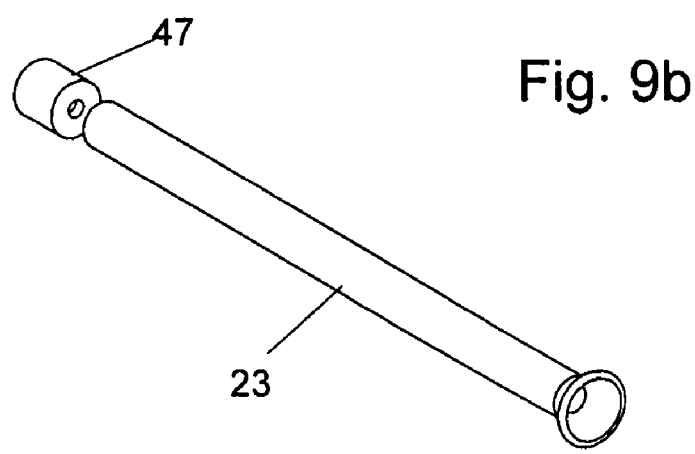
FIG. 9*b* is a perspective view of the FIG. 9*a* embodiment showing details of the microphone assembly.

FIG. 8 is a perspective view of the FIG. 7a embodiment that utilizes the exterior of the microphone boom as a monopole antenna. The boom 22 is longer than in FIG. 7a, approximately 30 mm long which corresponds to a quarter wavelength at 2.4 GHz. In this case, the antenna is integrated into the conductive outer tube of the boom. The length of a resonant quarter-wavelength monopole antenna made of wire may be calculated from the following equation which takes into account a slight shortening for resonance: monopole antenna length=2808 inches/2400 MHZ=1.17 inches=29.72 mm Alternative Embodiment: Voice Tube—FIGS. 9a and 9b FIG. 9a is a perspective view of the FIG. 7a embodiment that utilizes a hollow voice tube 23. The voice tube conducts sound to the microphone which is located within the electronics cover 54b. The voice tube may act as a quarter wavelength monopole antenna.

FIG. 9b is a perspective view of the FIG. 9a embodiment showing the voice tube 23 and cylindrical microphone 47. Knowles Acoustics of Itasca, Ill. produces a number of miniature microphones including the FG Series. FG Series microphones have a weight of 0.08 gram and dimensions of 2.565 mm diameter and 2.565 mm length. These microphones have three terminals, positive, negative, and output (terminals not shown in this drawing).

Alternative Embodiment: Replaceable Speaker Boom—FIGS. 10a and 10b

Figure 10A:
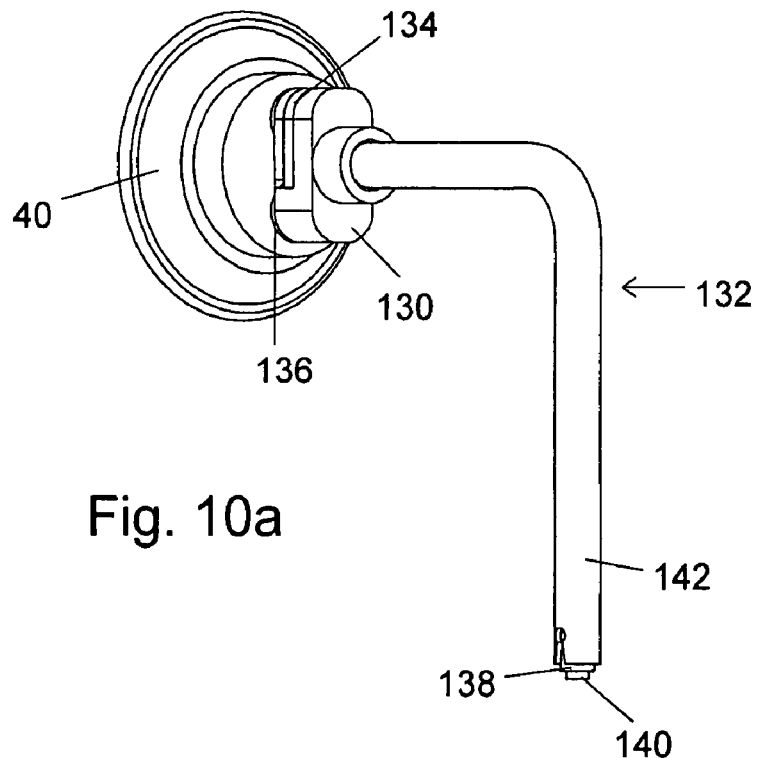
FIG. 10*a* is a perspective view of a replaceable speaker boom.

FIG. 10a is a perspective view of a replaceable speaker boom which can be used with any of the earset embodiments. A replaceable boom assembly 137 makes physical and electrical contact with a boom socket assembly 130. The boom socket assembly makes electrical contact with the speaker 40.

Figure 10B:
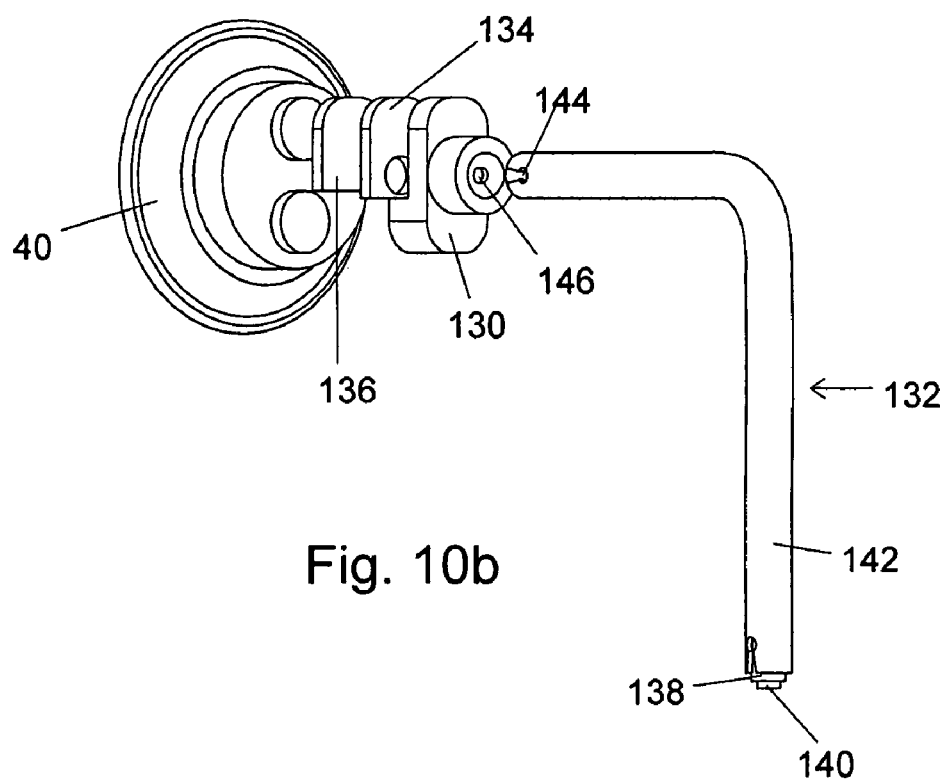
FIG. 10*b* is a perspective view of the boom of FIG. 10*a* disassembled.

FIG. 10b is a disassembled perspective view of the boom of FIG. 10a. The boom socket assembly 130 consists of a boom socket 132, a boom socket insulator 134, and a boom socket contact 136. The boom assembly consists of an outer boom tube 142, a boom insulator 138, which is also tubular and fits inside the boom tube, and a boom core 140 which is cylindrical in cross section, fits inside the boom insulator, and extends from each end of the boom. The boom assembly is assembled with the boom socket by pressing the boom into the socket. The boom is held in the socket by the engagement of a set of two boom snap studs 146 that engage a set of two boom snap slots 144. At its other end the boom similarly attaches to the electronics assembly (electronics assembly not shown in FIG. 10a or FIG. 10b). FIG. 10b illustrates a boom and socket that assemble by snapping together, but the parts can alternatively be assembled using threads, adhesive, or other analogous means.

When the speaker boom is rigid or semi-rigid it helps to stabilize and support the weight of the earset. Variations in pinna size and shape and piercing location necessitate that a rigid boom be adjustable. Techniques disclosed in this application for adjusting the boom include using stiff but bendable material in the boom that can be adjusted using tools such as pliers, or the boom can be adjusted using finger pressure. Different standard boom lengths and shapes can integrated into the unit during fabrication or different standard lengths and shapes may be field installed. Alternatively, combinations of different boom shapes or sizes can be combined with limited adjustability.

Figure 11:
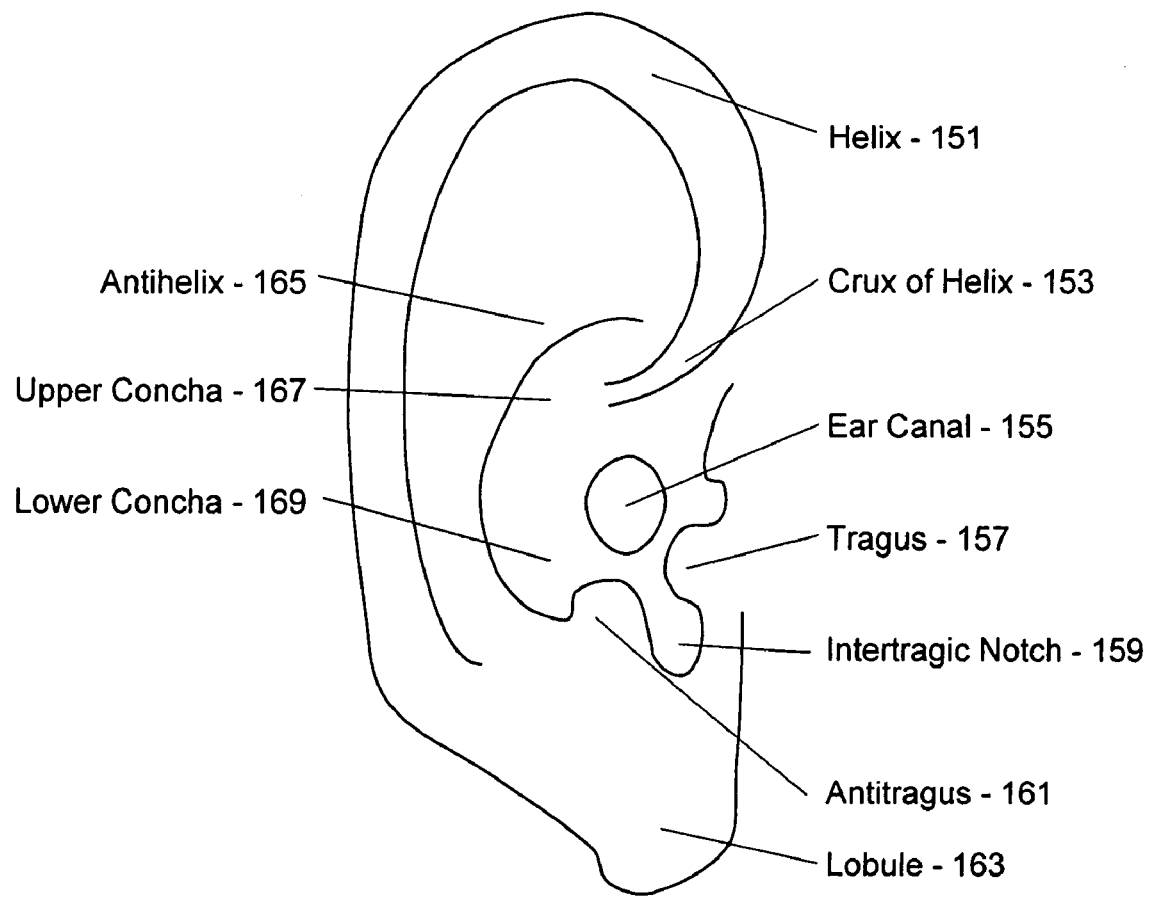

FIG. 11 is a diagram detailing the parts of the human pinna.

Alternative Embodiment: Non-Canal Speaker—FIGS. 12a and 12b

Figure 12A:
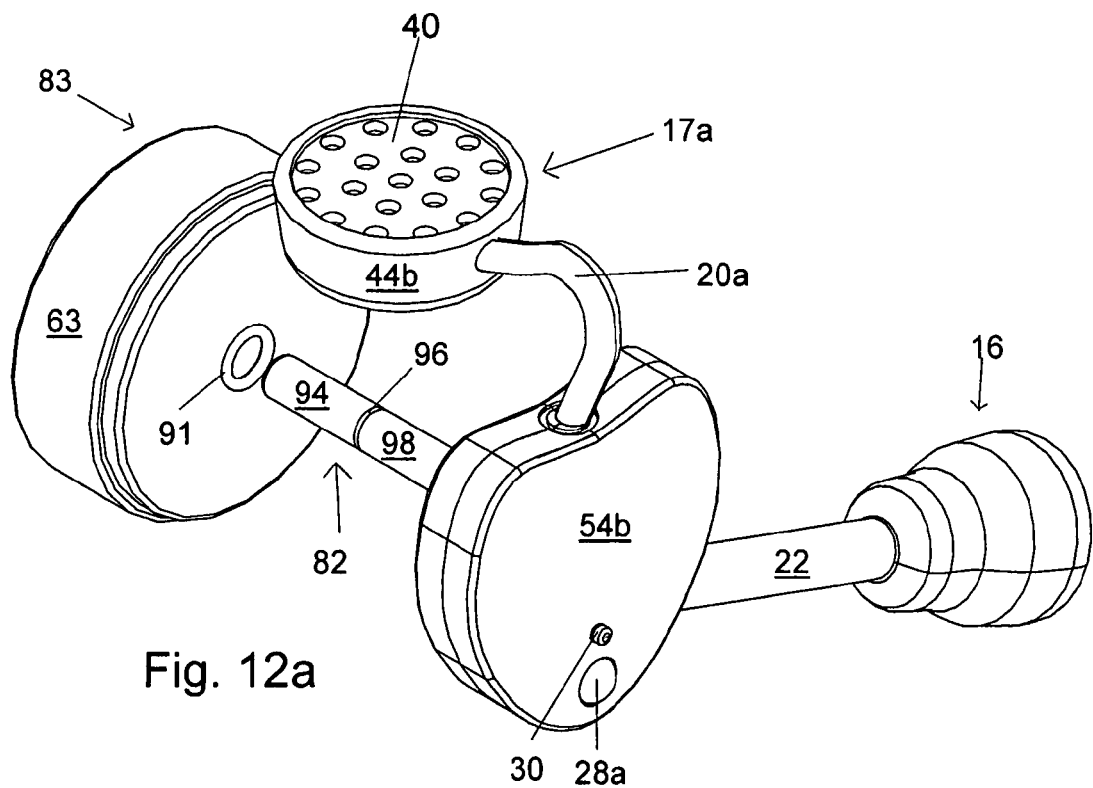
FIG. 12*a* is a perspective view of a two-piece embodiment that utilizes a speaker positioned in the lower concha.

FIG. 12a is a perspective view of a two-piece embodiment that utilizes a speaker assembly 17a that is positioned within the pinna but outside the ear canal. A non-canal speaker assembly 17a attaches to the upper left of the electronics assembly using an non-canal speaker boom 20a. A non-canal speaker cover 44b encases the speaker 40 and associated wires and mounting hardware (not visible in this figure). In use, the speaker boom may be routed through the intertragic notch and the speaker assembly may be positioned in contact with a cartilaginous area of the pinna, such as the lower concha. Sound from the speaker is transmitted both through the air and through the cartilage of the pinna.

Figure 12B:
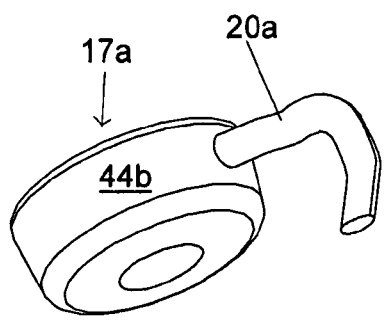
FIG. 12*b* is a perspective view of a part of the FIG. 12*a* embodiment showing the underside of the non-canal speaker.

FIG. 12b is a perspective view of a part of the FIG. 12a embodiment showing the underside of the non-canal speaker cover. The speaker cover 44b is rounded for comfort and to maximize the surface area in contact with the lower concha, thus maximizing sound transmission through the cartilage.

The non-canal speaker boom 20a is curved to mate with the contours of the pinna traversing the intertragic notch. Details of the speaker wires and boom attachment means are not shown in this figure but are analogous to those shown in previous figures for pinna canal type speaker assemblies.

Figure 13:
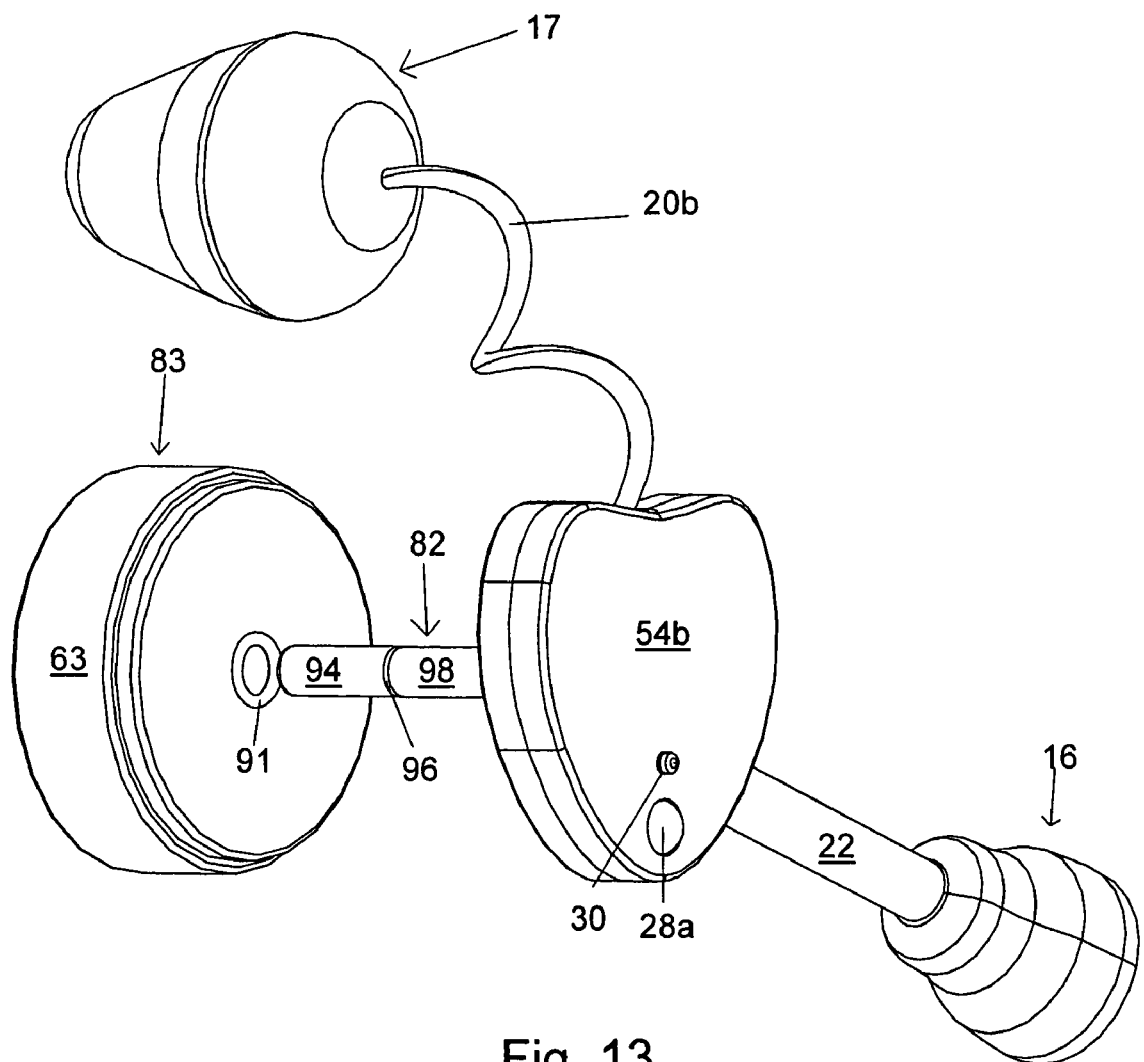

FIG. 13 is a perspective view of a two-piece embodiment that utilizes a flexible speaker cord 20b. A flexible speaker cord allows the earset to fit a variety of pinna sizes and shapes without adjustment. In this embodiment the earset is supported by a combination of a post 82 positioned for piercing and clamping the earlobe between the battery assembly 83 and the electronics cover 54b. The speaker 14, shown as an earplug, does not provide support or stability here.

Figure 14:
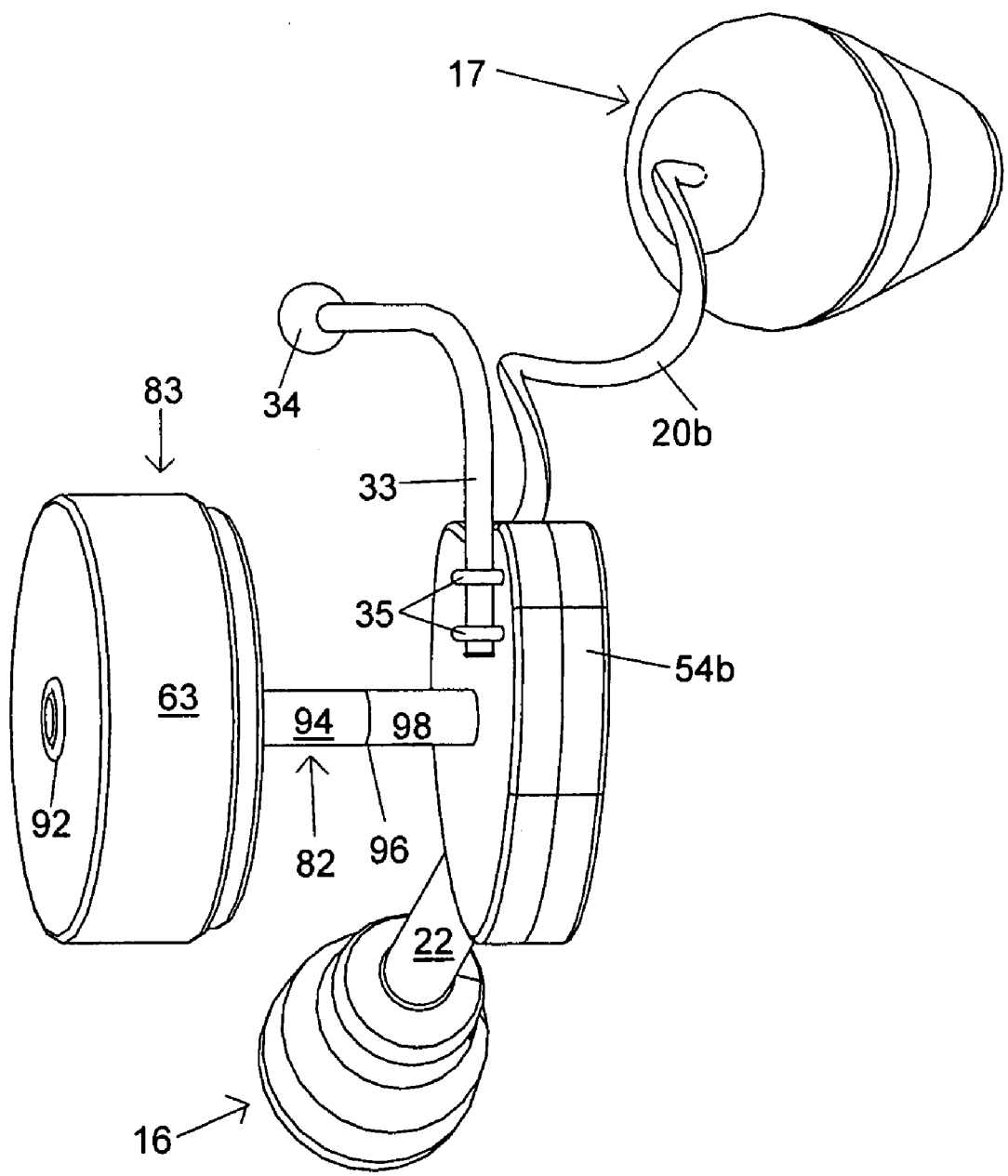

FIG. 14 is a perspective view of a two-piece embodiment that utilizes a flexible speaker cord 20b and an adjustable support boom 33. The support boom 33 is attached to the electronics cover 54b by a set of two support-boom brackets 35. The support-boom brackets hold the support boom firmly in place yet the boom may slide vertically and rotate to allow adjustment for various size and shape of ears. A support boom pad 34, formed from a soft material, is positioned at the tip of the boom. The boom pad 34 extends into the lower concha in use of the earset. The boom 33 extends through the intertragic notch and the boom pad 34 may be positioned in contact with a cartilaginous area of the pinna, such as the lower concha. The boom thereby supports the weight and stabilizes the earset.

Alternative Embodiment: Listen Only Earset—FIG. 15a

FIG. 15a shows an alternative embodiment of the invention wherein a wireless earset includes a speaker assembly 14 with a flexible cord 20b, and an electronics housing 54b, but without a microphone. This earset is shown with a flexible cord 20b extending from the speaker assembly 14 to the electronics housing 54b, so that, as in FIGS. 13 and 14, the speaker does not assist in supporting or stabilizing the earset. The earset is also shown with a battery 63 which has a central hole, to receive a conductive pierce post 82 affixed to and extending from housing 54b. This structure is discussed previously in connection with other embodiments, such as those of FIGS. 12a, 12b and 13. The ear connection and battery containment can alternatively be more like what is shown in FIGS. 1a-1d. Also, the earset shown in FIG. 15a includes an antenna at any appropriate position, connected to electronics of electronics housing 54b. Audio volume may be controlled from the host device. The speaker only embodiment requires only a wireless receiver and does not absolutely require transmit capability, though without transmit capability the earset cannot request re-transmit of missed packets which may degrade audio quality.

Alternative Embodiment: Wired Connector—FIGS. 15b and 15c

FIG. 15b is a perspective view of a listen only earset. The earset utilizes a quarter wavelength antenna wire 68b suspended from the bottom of a pentagonal electronics cover 54c by a short flexible connector wire 71. The antenna wire may be straight or coiled. The battery unit within housing 80a, post power conductors 82a and 84a, and the power connectors 36a and 37a are illustrated in FIGS. 7f and 7g.

FIG. 15c is a perspective view of a listen only earset. The antenna wire 68b is suspended from the bottom of the cover 54c by a connector wire 71. The antenna wire is coiled. The front face of the electronics cover 54c may be decorated with an etched pattern and small gems.

One suitable serial bus 37a, 36a for the listen only earset of FIG. 15c is known as the Universal Serial Bus (USB). USB is a serial bus standard to interface devices. The design of USB is standardized by the USB Implementers Forum (USB-IF), an industry standards body incorporating leading companies from the computer and electronics industries. The connectors are designed to be robust. It is difficult to incorrectly attach a USB connector. A moderate insertion/removal force is specified. USB cables and small USB devices are held in place by the gripping force from the receptacle (without the need for the screws, clips, or thumbturns other connectors require).

The utility of the serial bus connection allows new modes of operation. The bus can be used to download audio content to the earsets for immediate play (wired mode), to download audio content for storage and later play (MP3 mode), to power operation of the earset, to charge the earset battery, even possibly to download new operational firmware. Any time the earset is connected to the bus it should be assumed that earset battery power is not being used. Bus power is being utilized to power the device and charge the battery (if needed).

Dual Use Wired and Wireless

When a wired serial bus is connected and downloading audio content to the earsets for immediate play then the earsets are operating in wired mode. In wired mode the earsets emulate a standard wired headset. No wireless communication is needed. Bus power is not driving the earset and the battery is not being utilized. When the bus is not connected the device reverts to wireless battery-powered operation. Any of the earset embodiments may be modified for dual wired and wireless use.

Audio Storage and Play (MP3 Mode)

MP3 players download digital audio files, store the files in memory or other non-volatile storage media, and later play the digital audio under user control. Many millions of MP3 players have been manufactured by various companies. The technology required to build MP3 players is well known in the art.

In MP3 mode the earset plays previously downloaded audio content stored in onboard memory. The bus is connected during the download process but is disconnected while playing. With the addition of a non-volatile memory store the wireless earset can emulate the operation of an MP3 player. Each earset stores the same audio program or a single channel of the same stereo audio program.

A remote control device sends wireless commands to the earsets to start playing, stop playing, change volume, specify the audio program sequence, synchronize the earsets, etc. The remote control may or may not have information regarding the audio program such as the sequences of song names, artist information, duration, etc. An advantage of the MP3 mode is that the wireless receiver or transceiver is used only for low bandwidth transfers. A low bandwidth receiver or transceiver can use much less power than a high bandwidth transceiver because it performs less digital signal processing, can hibernate between commands, and in the case of the receiver only configuration, doesn't transmit.

Autonomous Mode

MP3 mode earsets may play audio content in autonomous mode with no external communication link whatsoever. In the simplest case, the earset at power-on begins playing a loop of audio content at a predefined volume level. The earset calculates the correct position in the audio loop based on the earset's own internal clock. Without a wireless link, the two earsets cannot be synchronized by wireless commands. This requires that the two earsets' internal clocks are synchronized while the devices are connected to the bus and the clocks maintained even when neither the battery nor bus is connected to the earset. Addition of earset power and volume may improve usability of autonomous earsets, but these controls are not strictly required. Note that in autonomous mode the earsets are still wireless.

Alternative Embodiment: Hanging Earset—FIG. 16

Figure 16:
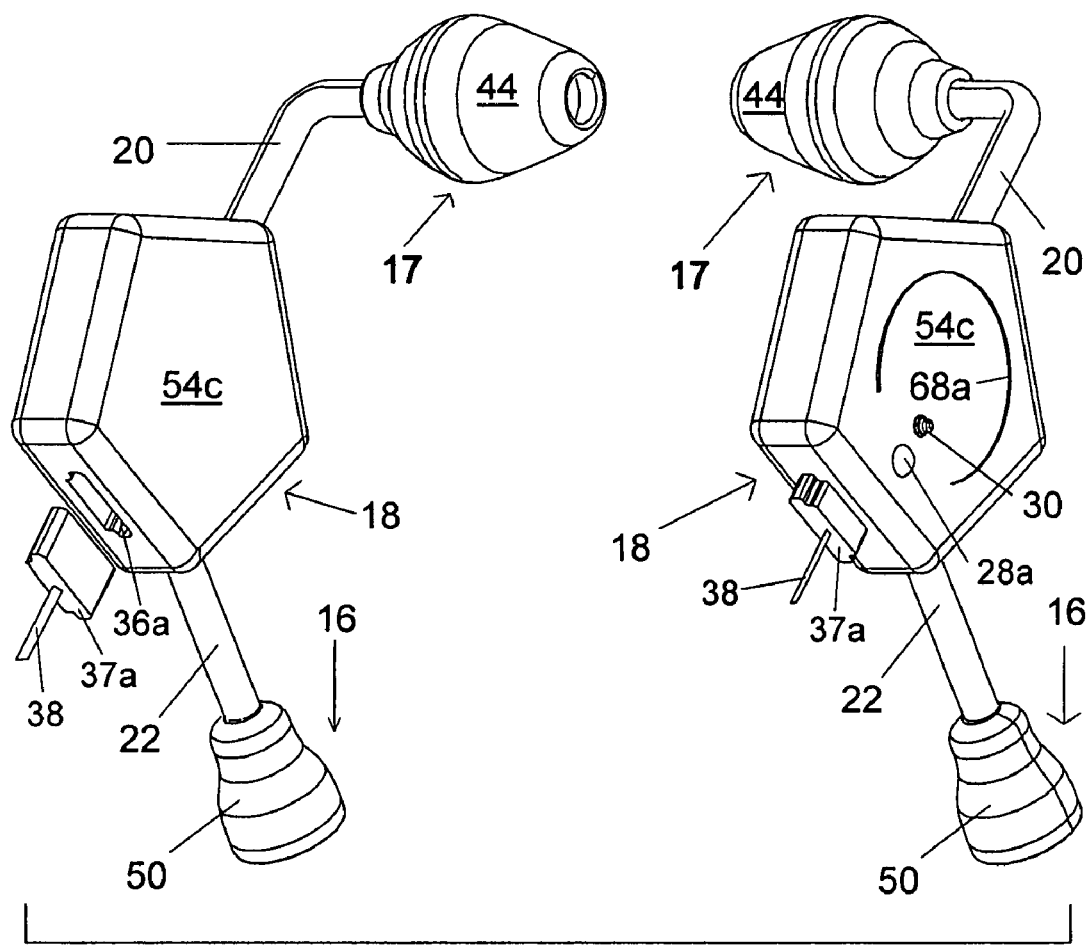
FIG. 16 is a perspective view of a pair of earsets that hang from the speaker assembly.

FIG. 16 is a perspective view of a pair of earsets that hang from the speaker assembly 17. The weight of the headset or earset is supported by means of the speaker assembly inserted into the wearer's ear canal. The boom 20 must be rigid enough to support the weight of the earset without deformation. The speaker boom may be formed to make contact with an area of the pinna such as the lower concha or intertragic notch to support and stabilize the earset. A support boom, as shown in FIG. 14, may be added to this embodiment to help support weight and enhance stability. Visible on the right earset are the antenna 68a, a power switch 28a, and an LED 30. The earsets connect via serial port with a host device for power and data downloading. The battery is internal and not visible in this view. This embodiment is well suited for dual use wired and wireless. Battery size can be minimized somewhat because the earset can easily be plugged into the host to recharge while maintaining operability. In wired mode operation the earset is immune to RF interference and eavesdropping, and also does not interfere with other RF devices.

Alternative Wireless Technologies

Alternative embodiments may use other wireless protocols and carriers for communication between the headset and host. These include IEEE 802.11 which uses RF, magnetic induction communications, and IrDA which uses the infrared band.

IEEE 802.11 refers to a family of specifications developed by the Institute of Electrical and Electronics Engineers for wireless local area network (LAN) technology. 802.11 specifies an over-the-air interface between a wireless client and a base station or between two wireless clients. 802.11 operates in the same 2.4 GHz band as does Bluetooth, though using frequency hopping techniques the two can coexist in the same area. 802.11 is typically longer range and higher power than Bluetooth.

Magnetic induction communication (sometimes called near-field magnetic communications) is being used now in a mobile phone headset sold by Michigan-based foneGEAR Inc. FoneGEAR is using the technology developed by Aura Communications Inc. of Wilmington, Mass. Aura's magnetic induction communications technology, which it sells under the trademark LibertyLink, operates in the 13.5 MHZ spectrum for headsets and transmits digital signals over a range limited to about six feet. Aura's technology sends signals between two devices by coupling a low-power, non-propagating, quasi-static magnetic field. The technology reportedly requires less power and requires fewer components than Bluetooth. Data rates can range from 64 kilobits per second for voice to 204.8 kbps for data.

The Infrared Data Association (IrDA) has specified the physical and protocol layers necessary for any two devices that conform to the IrDA standards to detect each other and exchange data. The devices must have an unobstructed line of sight. The initial IrDA 1.0 specification detailed a serial, half-duplex, asynchronous system with transfer rates of 2400 bits/s to 115,200 bits/s at a range of up to one meter with a viewing half-angle of between 15 and 30 degrees. IrDA has extended the physical layer specification to allow data communications at transfer rates up to 4 Mbits/s.

Two-Earring Embodiment

This application primarily describes the earset as being worn on a single pinna, but a pair of earring earsets may also be used. The advantages of using two earrings include clearer sound, stereo sound, and clearer voice pickup. Tradeoffs compared to one earring include higher cost and a requirement to wear two devices. The wireless protocol can be configured with the host recognizing the presence of two earsets, or the two earsets can be configured to appear as a single device to the host. The earsets can define their own sub-net, with one of the earsets acting as sub-net master and communicating with the other earset and the host. With two microphones aligned in an array, a straightforward algorithm predicated upon a time-delay principle can be configured to filter the audio input by attenuating sound which is not received by both microphones within a range of simultaneity. Acoustic waves outside the range are attenuated. Knowles Acoustics has developed an algorithm that predicates itself upon a time-delay principle to configure an array processor with a predetermined Look Angle and Angle of Acceptance onto the speech source. All acoustic plane waves outside the angle of acceptance are attenuated by greater than 15 dB for a two-element array.

Audio Processing Modes

The microphone input may be used for three different purposes, depending upon the current state of the device. In the first case, where the device is being used as a phone earset, the user's words are received by the microphone, processed, and transmitted to the host phone via the wireless link. In the second case, where the user is interacting with the immediate environment, the microphone input is routed to the earset speaker. In the third case, where the user wishes to mute environmental sound, the microphone input is used to generate anti-noise for active noise control. Note that audio streams may be mixed so that the user is listening to a voice or audio stream mixed with the anti-noise or environmental sound stream.

Digital Signal Processing (DSP) may be used to sharpen the call at both ends. DSP functions include "active noise cancellation", automatic speaker volume control depending on ambient sound levels, automatic analysis of incoming signal to raise the volume of softer sections over the noise floor, and subtraction of ambient noise from the output audio.

The wireless earring earset of various embodiments provides a small, lightweight headset that attaches securely yet comfortably to the user's ear pinna and can be easily adjusted to fit a variety of pinna shapes. It is quick and easy to attach and detach and may be worn comfortably for long periods. The earset may be shaped and decorated as jewelry that combines beauty with utility. It can interface with a cell phone, a wired phone, a digital audio player, or a computer and act as a bidirectional phone headset, an audio headset, or a voice interface to a computing device. It can be configured to act as either an open design, allowing outside sound to be heard, or as a closed design, excluding outside sound, under electronic control of the user. When configured as an open design, or when not in use, it need not be removed to interact with the outside world.

Although the description above contains many specifities, these should not be construed as limiting the scope of the invention but as merely providing illustrations of some of the presently preferred embodiments of the invention.

For example, rather than canal speakers that are seated in the ear canal or earbuds which are worn pointing toward the ear canal, the speakers may be earbuds which are vertically mounted and worn sideways.

Reference herein to the pinna, especially in regard to the earset being connected to or suggested on the pinna, is intended to include the ear canal.

The electronics module and cover may be formed in shapes other than the illustrated rectangular, circular, and heart shapes. The detachable post, adjustable post, two-piece embodiments, etc. may be used in combination with any cover shape.

The speaker and microphone are shown at the end of booms. The booms are intended to show one method of mounting these audio components, but the speaker and/or microphone can, for example, be mounted at either end of an integrated housing which contains the processor, switch, LED, and possibly the post and battery. Speaker assemblies are shown with radially symmetrical housings, but the speaker housing can be non-symmetrical for better match with pinna contours.

In the drawings, the post is positioned to attach to a piercing through the earlobe, but there are many positions on the pinna which are commonly pierced. The piercing positions include but are not limited to various positions on the lobe, the inner conch, the outer conch, the helix, the crus of helix, the tragus, the antitragus, the outer conch cartilage, etc. Any of these positions is suitable for mounting the earset.

The earring earset is described as communicating with a phone, but may also communicate with a computer or other portable computing device. The earset may be used to provide voice commands to the computer or to make Internet phone calls (voice over IP). The earset may be used to communicate with devices that combine a cell phone and small computer or personal digital assistant (PDA), so called smart phones, that are becoming common.

Although the earset power source is described as a battery, other power sources may be used. These include fuel cells and ultra-capacitors such as electrochemical double-layer capacitors or nanogate capacitors.

The earset may incorporate advanced headset features. Voice dialing is a feature that uses voice recognition to initiate calls. DSP features may be used to enhance voice quality. The earset may omit user interface switches and LEDs. The earset may power on when assembled, while call pickup/hangup and audio volume may be controlled by the host phone or computer.

The above described preferred embodiments are intended to illustrate the principles of the invention, but not to limit its scope. Other embodiments and variations to this preferred embodiment will be apparent to those skilled in the art and may be made without departing from the spirit and scope of the invention as defined in the following claims and their legal equivalents.

I claim:

1. A wireless audio headset for connection to and suspension from a human ear, comprising:
   a speaker for engagement with the pinna of the ear,
   a housing with electronics connected by conductors to the speaker, including a transceiver,
   an antenna connected to the electronics,
   a microphone connected by conductors to the electronics in the housing and extending from the housing toward a user's mouth, and
   an ear pierce post connected to and extending from the electronics housing so as to be positioned at the lobe of the ear, with clutch means for securing to an outer end of the ear pierce post, to secure the housing to the lobe of a user's ear when the pierce post extends through a piercing in the lobe.

2. The headset of claim 1, wherein the speaker forms part of an ear plug configured to extend into the ear canal.

3. The headset of claim 2, including a speaker boom extending between the earplug and the electronics housing, the boom containing the conductors between the speaker and the electronics, and the boom being configured such that the engagement in a user's ear canal provides stability for the headset, with the remaining weight of the headset carried by the piercing connection to the ear lobe.

4. The headset of claim 3, including a battery, the battery being retained in a casing connected to the outer end of the pierce post and positioned to be on an opposite side of the pinna from the housing with electronics, the connection of the pierce post to the battery casing also providing electrical connection to supply power to the housing with electronics.

5. The headset of claim 4, wherein the battery casing comprises said clutch means.

6. The headset of claim 4, wherein the battery and casing include a central hole and the pierce post extends into the central hole.

7. The headset of claim 4, wherein the battery is rechargeable, and the casing has a power socket connected to the battery and exposed at the exterior to receive a power plug fitting into the power socket, whereby the headset may be connected to such a power plug for recharging the battery when needed.

8. The headset of claim 1, including a rechargeable battery and including a power socket connected to the battery and exposed at the exterior of the headset to receive a power plug fitting into the power socket, whereby the headset may be connected to such a power plug for recharging the battery when needed.

9. The headset of claim 1, including a battery contained within the housing with electronics, the battery powering the electronics, speaker and microphone.

10. The headset of claim 1, including means for adjustment of the relative positions of the ear pierce post and the speaker, to accommodate different users.

11. The headset of claim 1, wherein a microphone boom extends from the housing, with the microphone supported at an end of the microphone boom.

12. The headset of claim 11, wherein the microphone boom includes said antenna.

13. The headset of claim 1, further including a hollow voice tube extending from the microphone, in a direction to extend toward a user's mouth.

14. The headset of claim 13, wherein said antenna comprises a quarter wavelength wireless antenna on the voice tube.

15. The headset of claim 1, wherein a speaker boom extends from the housing to the speaker with a releasable connection, so that speaker booms with different lengths can be interchanged to accommodate different users.

16. The headset of claim 15, wherein the speaker boom connects to both the speaker and the housing in a releasable connection comprising a socket on each of the speakers and the housing and a plug end at two ends of the boom, for pushing into and locking with the respective sockets, making electrical connection as well as mechanical connection.

17. The headset of claim 1, wherein the speaker is positioned on the headset to engage in the lower concha of the ear pinna, not entering the ear canal.

18. The headset of claim 1, further including a magnet connection between the ear pierce post and the electronics housing, such that the pierce post can be removed from the electronics housing.

19. The headset of claim 18, wherein the pierce post has secured to it a base magnet, and the housing has a housing magnet to which the base magnet is attracted.

20. The headset of claim 19, wherein the electronics housing has a plurality of housing magnets, so that the pierce post can be located at different positions on the housing to accommodate different users.

21. The headset of claim 1, wherein the speaker is connected to the housing with a flexible speaker cord.

22. The headset of claim 1, wherein an adjustable, bendable boom connects the speaker to the electronics housing, such that the boom can be adjusted to accommodate different users.

23. The headset of claim 1, wherein a swivel-adjustable speaker boom connects the speaker to the electronics housing, so that the boom can be adjusted by rotation to accommodate different users.

24. The headset of claim 1, wherein the housing includes a serial bus port accessible at its exterior for receipt of a serial bus connector, and the electronics including means for bypassing the antenna to operate in wired mode when desired.

25. An audio headset for connection to and suspension from a human ear, comprising:
a speaker for engagement with the pinna of the ear,
a housing with electronics connected by conductors to the speaker, including a transceiver,
an antenna connected to the electronics,
a microphone connected by conductors to the electronics in the housing and positioned to extend toward a user's mouth, and
an ear pinna gripping means extending from the housing, positioned for connection to an ear lobe of a user's ear to stabilize and support the headset.

26. The headset of claim 25, wherein the ear pinna gripping means comprises a clamp positioned to engage the ear lobe.

27. The headset of claim 26, wherein the ear clamp comprises a spring clamp.

28. The headset of claim 26, further including adjustment means for adjusting the distance between the ear clamp and the speaker to accommodate different users.

29. The headset of claim 25, wherein the speaker forms part of an ear plug configured to extend into the ear canal.

30. The headset of claim 29, including a speaker boom extending between the ear plug and the electronics housing, the boom containing the conductors between the speaker and the electronics, and the boom being configured such that the engagement in a user's ear canal provides stability for the headset and carries some of the weight of the headset, with the remaining weight of the headset carried by the ear clamp connection to the pinna.

31. The headset of claim 25, including a speaker boom extending between the earplug and the electronics housing, the boom containing the conductors between the speaker and the electronics, and the boom being configured such that the engagement in a user's ear canal provides stability for the headset and carries some of the weight of the headset, with the remaining weight of the headset carried by the piercing connection to the pinna.

32. The headset of claim 25, including a speaker boom extending from the housing to the speaker, the speaker boom being connected in a releasable connection to the housing such that speaker booms with different lengths can be interchanged to accommodate different users.

33. The headset of claim 25, wherein the microphone includes a hollow voice tube positioned to extend from the microphone toward a user's mouth.

34. A wireless audio headset for connection to and suspension from a human ear, comprising:
a speaker for engagement with the pinna of the ear,
a housing with electronics connected by conductors to the speaker,
an antenna connected to the electronics, and
an ear pierce post connected to and extending from the electronics housing so as to be positioned at the lobe of the ear of a user, with clutch means for securing to an outer end of the ear pierce post, to secure the housing to the lobe of a user's ear when the pierce post extends through a piercing in the lobe.

35. The headset of claim 34, wherein the speaker forms part of an ear plug configured to extend into the ear canal.

36. The headset of claim 35, including a speaker boom extending between the earplug and the electronics housing, the boom containing the conductors between the speaker and the electronics, and the boom being configured such that the engagement in a user's ear canal provides stability for the headset and carries some of the weight of the headset, with the remaining weight of the headset carried by the piercing connection to the pinna.

37. The headset of claim 36, including a battery, the battery being retained in a casing connected to the outer end of the pierce post and positioned to be on an opposite side of the pinna from the housing with electronics, the connection of the pierce post to the battery casing also providing electrical connection to supply power to the housing with electronics.

38. The headset of claim 37, wherein the battery casing comprises said clutch means.

39. The headset of claim 37, wherein the battery and casing include a central hole and the pierce post extends into the central hole.

40. The headset of claim 34, including a battery contained within the housing with electronics, the battery powering the electronics and the speaker.

41. The headset of claim 34, including means for adjustment of the relative positions of the ear pierce post and the speaker, to accommodate different users.

42. The headset of claim 34, wherein a speaker boom extends from the housing to the speaker with a releasable connection, so that speaker booms with different lengths can be interchanged to accommodate different users.

43. The headset of claim 42, wherein the speaker boom connects to both the speaker and the housing in a releasable connection comprising a socket on each of the speakers and the housing and a plug end at two ends of the boom, for pushing into and locking with the respective sockets, making electrical connection as well as mechanical connection.

44. The headset of claim 34, further including a magnet connection between the ear pierce post and the electronics housing, such that the pierce post can be removed from the electronics housing.

45. The headset of claim 44, wherein the pierce post pin has secured to it a base magnet, and the housing has a housing magnet to which the base magnet is attracted.

46. The headset of claim 34, wherein an adjustable, bendable boom connects the speaker to the electronics housing, such that the boom can be adjusted to accommodate different users.

47. The headset of claim 34, wherein a swivel-adjustable speaker boom connects the speaker to the electronics housing, so that the boom can be adjusted by rotation to accommodate different users.

48. The headset of claim 34, wherein the housing includes a serial bus port accessible at its exterior for receipt of a serial bus connector, and the electronics including means for bypassing the antenna to operate in wired mode when desired.

* * * * *